(12) United States Patent
Shimada et al.

(10) Patent No.: US 12,418,738 B2
(45) Date of Patent: Sep. 16, 2025

(54) PHOTOELECTRIC CONVERSION APPARATUS, PHOTOELECTRIC CONVERSION SYSTEM, AND PHOTOELECTRIC CONVERSION METHOD FOR SHADING CORRECTION

(71) Applicant: CANON KABUSHIKI KAISHA, Tokyo (JP)

(72) Inventors: Takeshi Shimada, Kanagawa (JP); Keisuke Takahashi, Tokyo (JP); Keita Masuda, Tokyo (JP); Hideo Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 245 days.

(21) Appl. No.: 18/453,342

(22) Filed: Aug. 22, 2023

(65) Prior Publication Data

US 2024/0080590 A1 Mar. 7, 2024

(30) Foreign Application Priority Data

Sep. 2, 2022 (JP) ................................ 2022-140208

(51) Int. Cl.
*H04N 25/78* (2023.01)
*H04N 25/51* (2023.01)
(Continued)

(52) U.S. Cl.
CPC ............ *H04N 25/78* (2023.01); *H04N 25/51* (2023.01); *H04N 25/61* (2023.01); *H04N 25/616* (2023.01); *H04N 25/677* (2023.01)

(58) Field of Classification Search
CPC ...... H04N 25/78; H04N 25/61; H04N 25/616; H04N 25/51; H04N 25/677
See application file for complete search history.

(56) References Cited

U.S. PATENT DOCUMENTS 7,538,805 B2 * 5/2009 Kubo ..................... H04N 25/00
348/340
7,990,440 B2 8/2011 Kobayashi et al.
(Continued)

FOREIGN PATENT DOCUMENTS

JP 2011-044813 A 3/2011
JP 2014-140152 A 7/2014
(Continued)

OTHER PUBLICATIONS

U.S. Appl. No. 18/453,343, filed Aug. 22, 2023 (First Named Inventor: Keisuke Takahashi).
(Continued)

*Primary Examiner* — Nicholas G Giles
(74) *Attorney, Agent, or Firm* — Venable LLP

(57) ABSTRACT

Photoelectric conversion apparatus includes read circuit for reading signals of pixel array, and signal processing unit for generating pixel signal by performing CDS on signals read by the read circuit and performing shading correction on the pixel signal. The read circuit has function of reading signal of the pixel array with first and second gain. The read circuit reads noise level with the first gain and reads optical signal level with the first or second gain from selected effective pixel for the correlated double sampling. In the shading correction, pixel signal of effective pixel from which optical signal level has been read with the first gain is corrected based on first correction value, and pixel signal of effective pixel from which optical signal level has been read with the second gain is corrected based on second correction value.

15 Claims, 14 Drawing Sheets

(51) Int. Cl.
*H04N 25/61* (2023.01)
*H04N 25/616* (2023.01)
*H04N 25/677* (2023.01)

(56) References Cited

U.S. PATENT DOCUMENTS

| | | |
|---|---|---|
| 8,710,558 B2 | 4/2014 | Inoue et al. |
| 8,884,391 B2 | 11/2014 | Fudaba et al. |
| 9,264,641 B2 | 2/2016 | Kobayashi |
| 9,294,699 B2 | 3/2016 | Muto et al. |
| 9,305,954 B2 | 4/2016 | Kato et al. |
| 9,357,122 B2 | 5/2016 | Kususaki et al. |
| 9,407,847 B2 | 8/2016 | Maehashi et al. |
| 9,438,828 B2 | 9/2016 | Itano et al. |
| 9,509,931 B2 | 11/2016 | Kobayashi et al. |
| 9,602,752 B2 | 3/2017 | Kobayashi et al. |
| 10,015,430 B2 | 7/2018 | Kobayashi et al. |
| 10,063,798 B2 * | 8/2018 | Oota ................ H04N 25/78 |
| 10,609,316 B2 | 3/2020 | Kobayashi |
| 11,070,755 B2 | 7/2021 | Takahashi |
| 11,268,851 B2 | 3/2022 | Kobayashi et al. |
| 11,431,929 B2 | 8/2022 | Kobayashi et al. |
| 11,463,644 B2 | 10/2022 | Soda et al. |
| 11,470,275 B2 | 10/2022 | Kobayashi et al. |
| 11,496,704 B2 | 11/2022 | Sato et al. |
| 11,616,925 B2 | 3/2023 | Kobayashi et al. |
| 11,653,114 B2 | 5/2023 | Nakazawa et al. |
| 11,688,755 B2 | 6/2023 | Kobayashi |
| 11,736,813 B2 | 8/2023 | Kobayashi |
| 11,800,253 B2 | 10/2023 | Saito et al. |
| 2004/0125226 A1 * | 7/2004 | Kubo .................... H04N 25/61 |
| | | 257/E27.152 |
| 2014/0104465 A1 | 4/2014 | Yamashita |
| 2017/0208268 A1 | 7/2017 | Shin |
| 2017/0208270 A1 * | 7/2017 | Oota .................. H04N 25/778 |
| 2017/0257592 A1 | 9/2017 | Higuchi |
| 2020/0314360 A1 | 10/2020 | Sakai et al. |
| 2020/0336681 A1 | 10/2020 | Kobuse et al. |
| 2020/0344431 A1 | 10/2020 | Kobuse et al. |
| 2022/0247964 A1 | 8/2022 | Kobayashi |
| 2022/0303484 A1 | 9/2022 | Kobayashi |
| 2022/0303485 A1 | 9/2022 | Kobayashi et al. |
| 2022/0303486 A1 | 9/2022 | Kobayashi |
| 2022/0321812 A1 | 10/2022 | Kobayashi et al. |
| 2022/0408036 A1 | 12/2022 | Ashida et al. |
| 2023/0041974 A1 | 2/2023 | Kobayashi |
| 2023/0070568 A1 | 3/2023 | Kobayashi et al. |
| 2023/0072715 A1 | 3/2023 | Kobayashi |
| 2023/0117988 A1 | 4/2023 | Kobayashi et al. |
| 2023/0154963 A1 | 5/2023 | Kobayashi et al. |
| 2023/0171514 A1 | 6/2023 | Kobayashi |
| 2023/0178580 A1 | 6/2023 | Yamazaki et al. |
| 2023/0179890 A1 | 6/2023 | Kobayashi et al. |
| 2023/0216459 A1 | 7/2023 | Kobayashi et al. |
| 2023/0247332 A1 | 8/2023 | Kobayashi et al. |
| 2023/0282654 A1 | 9/2023 | Kobayashi |

FOREIGN PATENT DOCUMENTS

| | | |
|---|---|---|
| JP | 2017-158062 A | 9/2017 |
| JP | 2019-022096 A | 2/2019 |
| JP | 2020-061669 A | 4/2020 |
| JP | 2020-167544 A | 10/2020 |
| JP | 2020-182057 A | 11/2020 |
| JP | 2020-191543 A | 11/2020 |
| JP | 2021-106375 A | 7/2021 |
| WO | 2013/008598 A1 | 1/2013 |
| WO | 2016/098404 A1 | 6/2016 |

OTHER PUBLICATIONS

U.S. Appl. No. 18/453,345, filed Aug. 22, 2023 (First Named Inventor: Keita Masuda).

* cited by examiner

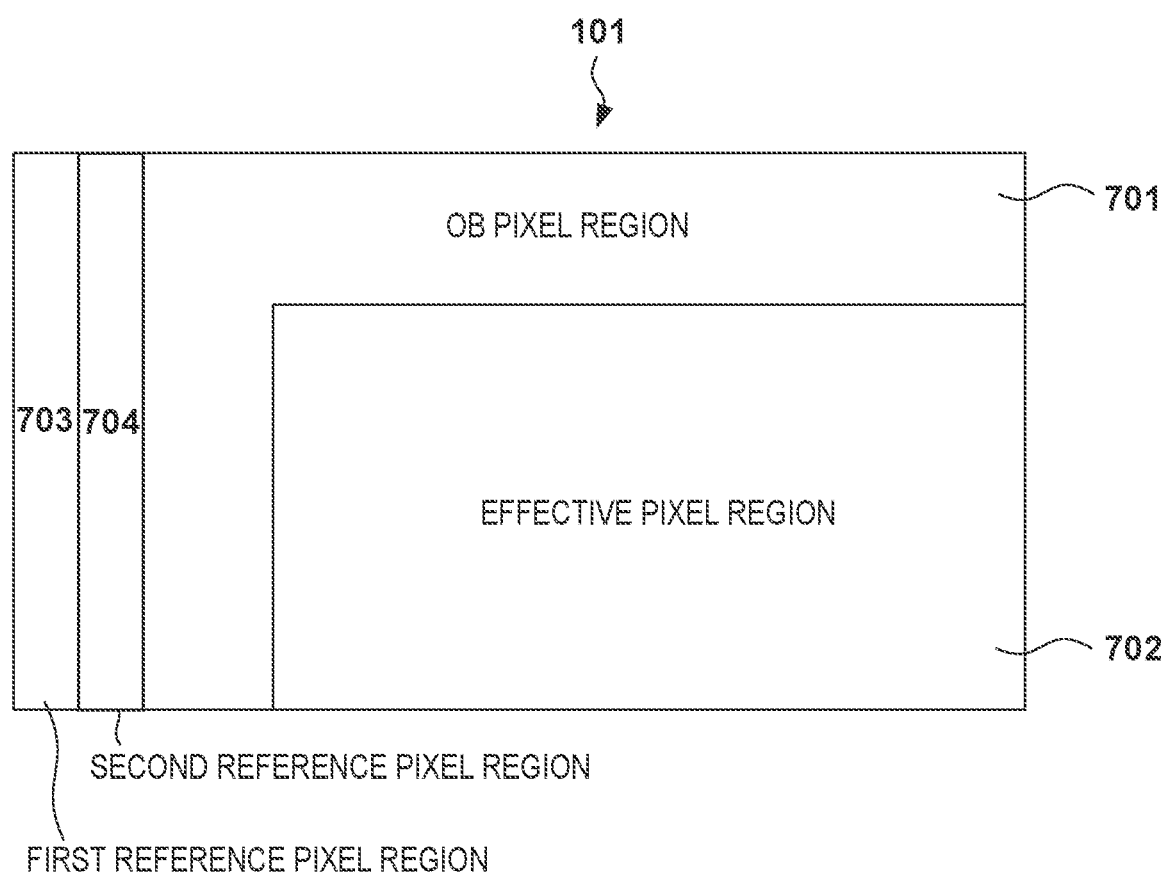

PHOTOELECTRIC CONVERSION APPARATUS, PHOTOELECTRIC CONVERSION SYSTEM, AND PHOTOELECTRIC CONVERSION METHOD FOR SHADING CORRECTION

BACKGROUND OF THE INVENTION

Field of the Invention

The present invention relates to a photoelectric conversion apparatus, a photoelectric conversion system, and a photoelectric conversion method.

Description of the Related Art

A photoelectric conversion apparatus is demanded to have a large number of pixels and a high frame rate. In order to satisfy the demand, one of challenges is to increase the readout speed of signals by the photoelectric conversion apparatus. In addition to increasing the readout speed, there is also a strong demand for improvement of the S/N ratio and expansion of the dynamic range. There is known a photoelectric conversion apparatus that performs analog-to-digital (A/D) conversion, using different A/D converter circuits, of a first pixel signal obtained by amplifying a pixel signal with a first gain and a second pixel signal obtained by amplifying the pixel signal with a second gain different from the first gain. The photoelectric conversion apparatus selectively outputs one of the A/D-converted first pixel signal and the A/D-converted second pixel signal in accordance with the level of the pixel signal. With this, it is possible to implement expansion of the dynamic range and improvement of the S/N ratio. Japanese Patent Laid-Open No. 2014-140152 discloses a technique of correcting the offset error and the gain error generated when selectively outputting the first pixel signal and the second pixel signal.

It is known that the S/N ratio is improved by a Correlated Double Sampling (CDS) process in which the optical signal level and noise level generated by photoelectric conversion are read out from a pixel, and a pixel signal corresponding to the difference between the optical signal level and the noise level is generated. However, if the gain used when reading out the optical signal level is different from the gain used when reading out the noise level, a noise component can remain in the pixel signal generated by the CDS process.

SUMMARY OF THE INVENTION

The present invention provides a technique advantageous in effectively reducing a noise component from a pixel signal.

One of aspects of the present disclosure provides a photoelectric conversion apparatus comprising a pixel array including a plurality of effective pixels, a readout circuit configured to read out a signal of the pixel array, and a signal processing unit configured to generate a pixel signal by performing correlated double sampling on signals read out by the readout circuit from an effective pixel selected from the plurality of effective pixels, and perform shading correction on the pixel signal, wherein the readout circuit has a function of reading out a signal of the pixel array with a first gain, and a function of reading out a signal of the pixel array with a second gain different from the first gain, the readout circuit reads out a noise level with the first gain and reads out an optical signal level with the first gain or the second gain from an effective pixel selected from the plurality of effective pixels for the correlated double sampling, and in the shading correction, a pixel signal of an effective pixel from which an optical signal level has been read out with the first gain is corrected based on a first correction value, and a pixel signal of an effective pixel from which an optical signal level has been read out with the second gain is corrected based on a second correction value.

Further features of the present invention will become apparent from the following description of exemplary embodiments with reference to the attached drawings.

BRIEF DESCRIPTION OF THE DRAWINGS

FIG. 7 is a view exemplarily showing the arrangement of a pixel array in the first embodiment;

DESCRIPTION OF THE EMBODIMENTS

Figure 1:
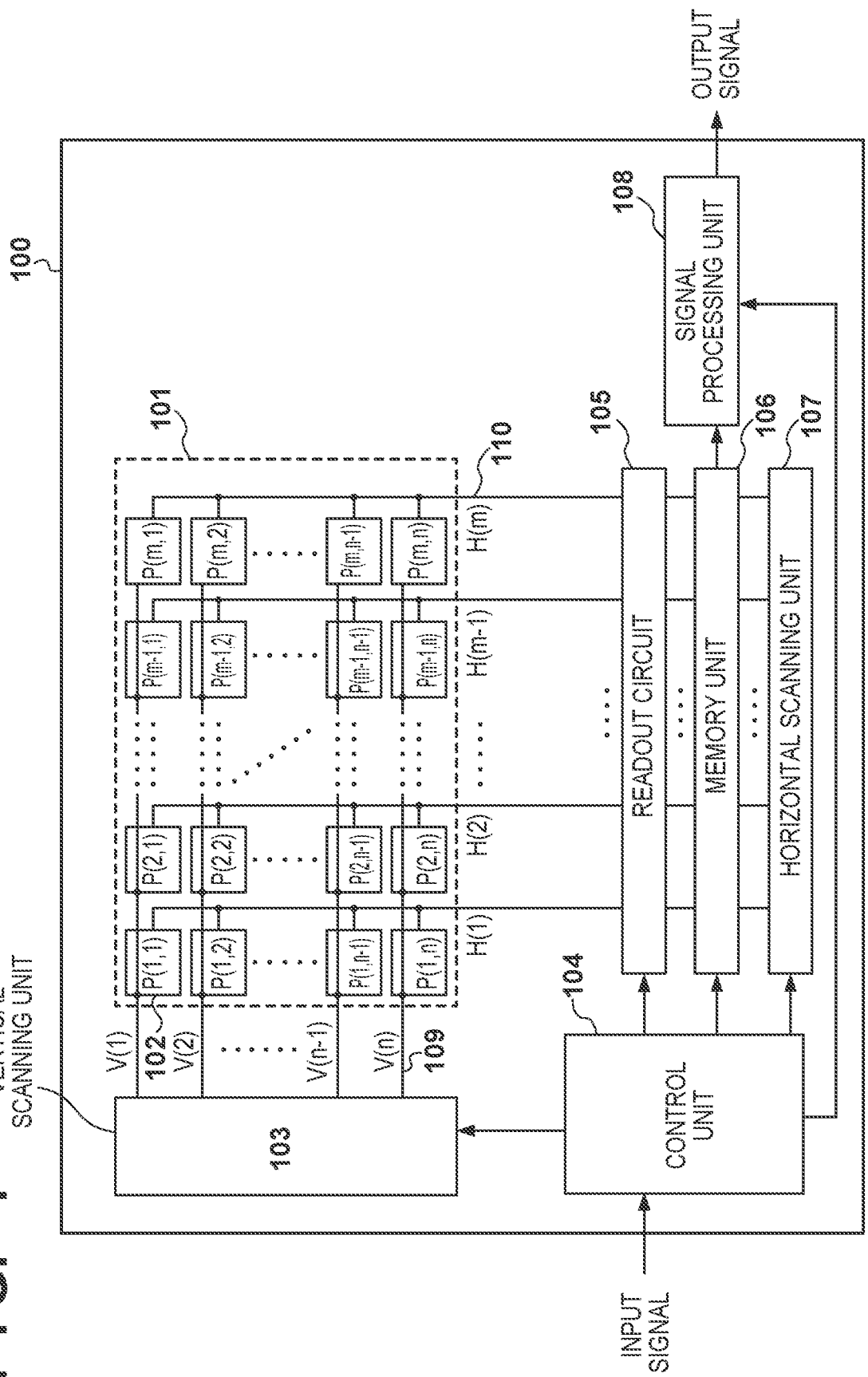
FIG. 1 is a view exemplarily showing the arrangement of a photoelectric conversion apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Hereinafter, with reference to FIGS. 1 to 9, a photoelectric conversion apparatus 100 according to the first embodiment of the present invention will be described below. The photoelectric conversion apparatus 100 may be composed of a chip formed by one semiconductor layer or semiconductor substrate, may be composed of a chip formed by a plurality of semiconductor layers or semiconductor substrates, or may be composed of a plurality of chips. The photoelectric conversion apparatus 100 can be formed as an image sensor or an apparatus including an image sensor.

FIG. 1 exemplarily shows the arrangement of the photoelectric conversion apparatus 100 according to the first embodiment. The photoelectric conversion apparatus 1100 can include a pixel array 101 which includes a plurality of pixels 102 arranged so as to form a plurality of rows and a plurality of columns. In order to distinguish the pixel 102 from a reference pixel and OB pixel to be described later, the pixel 102 can also be referred to as an effective pixel. The pixel array 101 can include a plurality of column signal lines 110. Each column of the pixel array 101 can be assigned with at least one column signal line 110. The photoelectric conversion apparatus 100 can also include a readout circuit 105 that reads out signals of the pixel array 101. The readout circuit 105 can have a function of reading out a signal of the pixel array 101 with a first gain, and a function of reading out a signal of the pixel array 101 with a second gain different from the first gain. The readout circuit 105 may be understood to have a function of reading out signals of the pixel array 101 with a plurality of gains different from each other. The readout circuit 105 can include a plurality of column circuits, and each column circuit can be configured to read out signals of the pixel array 101 through at least one column signal line 110.

The photoelectric conversion apparatus 100 can include a signal processing unit 108 that performs a correlated double sampling process (CDS process) and a correction process on signals read out from the pixels 102 (effective pixels) in the pixel array 101 by the readout circuit 105. The photoelectric conversion apparatus 100 can further include a vertical scanning unit 103, a control unit 104, and a horizontal scanning unit 107. In an arrangement example, the signal processing unit 108 can form a part of the photoelectric conversion apparatus 100. In another arrangement example, the signal processing unit 108 does not form a part of the photoelectric conversion apparatus 100. In this case, a system including the photoelectric conversion apparatus 100 and the signal processing unit 108 can be understood as a photoelectric conversion system. In such a photoelectric conversion system, the function of the signal processing unit 108 may be provided by a computer such as a personal computer, may be provided by a processor such as an ASIC, or may be implemented by another arrangement.

In the example shown in FIG. 1, the plurality of pixels 102 forming the pixel array 101 are arranged so as to form a matrix of m columns and n rows. The pixel unit 102 can also be written as a pixel $P(i, j)$ to indicate its position. i indicates the column where the pixel $P(i, j)$ is arranged, and j indicates the row where the pixel $P(i, j)$ is arranged. The vertical scanning unit 103 selects one row from n rows by n sets of row selection lines 109 ($V(j)$ ($j=1$ to n)). Selecting a row means selecting m pixels 102 arranged in the row. The signals of the pixels 102 arranged in the selected row can be read out by the readout circuit 105 via the column signal lines 110 ($H(i)$ ($i=1$ to m)). Readout by the readout circuit 105 includes a process of converting (that is, A/D-converting) a plurality of analog signals output from the pixels 102 to the column signal lines 110 into a plurality of digital signals in parallel, and the plurality of digital signals are temporarily stored in a memory unit 106. The readout circuit 105 may include an amplification circuit and the like. The amplification circuit can amplify the signal output from the pixel 102. The plurality of digital signals stored in the memory unit 106 can be then sequentially selected by the horizontal scanning unit 107 and supplied to the signal processing unit 108. The signal processing unit 108 processes the digital signals supplied as described above, and outputs signals obtained by the process. The control unit 104 can acquire setting information for setting the image capturing condition and the like in image capturing by the photoelectric conversion apparatus 100, and supply a control signal corresponding to the image capturing condition to each component included in the photoelectric conversion apparatus 100. The control unit 104 can be configured to control the vertical scanning unit 103, the readout circuit 105, the memory unit 106, the horizontal scanning unit 107, and the signal processing unit 108 based on the setting information.

Figure 2:
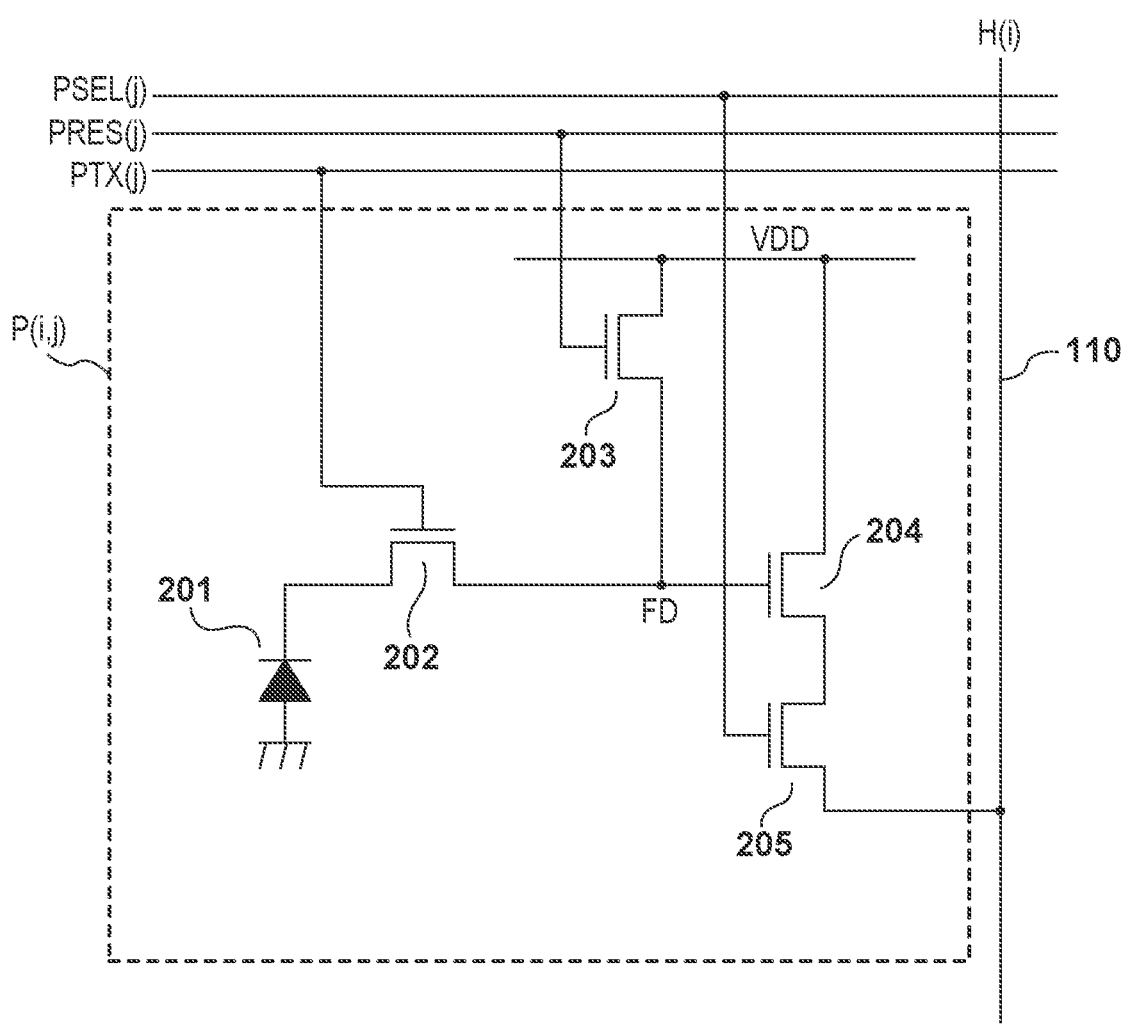
FIG. 2 is a view exemplarily showing the arrangement of a pixel.

FIG. 2 shows an arrangement example of the pixel 102($P(i, j)$). The pixel 102 can include, for example, a photoelectric conversion element 2201, a transfer transistor 202, a floating diffusion FD, a reset transistor 203, an amplification transistor 204, and a selection transistor 205. The photoelectric conversion element 201 performs photoelectric conversion, thereby generating electric charges corresponding to the incident light amount. The photoelectric conversion element 201 is, for example, a photodiode. The transfer transistor 202 transfers the electric charges generated by photoelectric conversion in the photoelectric conversion element 201 to the floating diffusion FD. The electric charges transferred to the floating diffusion FD are converted into a potential by an electrostatic capacitance included in the floating diffusion FD. The amplification transistor 204 outputs a signal corresponding to the potential of the floating diffusion FD to the column signal line 110. The reset transistor 203 resets the potential of the floating diffusion FD to a predetermined potential. One row selection line 109 ($V(j)$) described above includes a transfer control line $PTX(j)$, a reset control line $PRES(j)$, and a row selection line $PSEL(j)$ used to control the transfer transistor 202, the reset transistor 203, and the selection transistor 205, respectively. Note that a transfer control signal, a reset control signal, and a row selection signal respectively supplied to the transfer control line $PTX(j)$, the reset control line $PRES(j)$, and the row selection line $PSEL(j)$ are also identified as $PTX(j)$, $PRES(j)$, and $PSEL(j)$, respectively.

Figure 3:
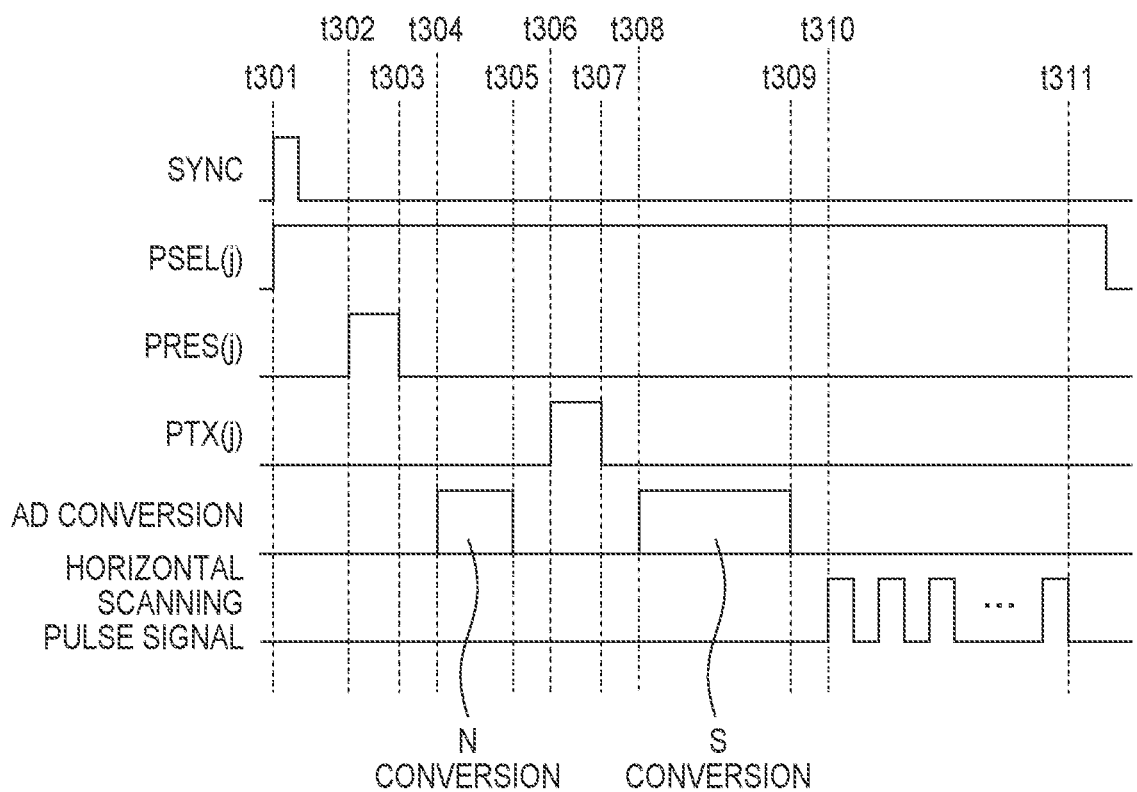
FIG. 3 is a view for explaining a basic readout operation of the photoelectric conversion apparatus according to the first embodiment.

Next, with reference to FIG. 3, a basic readout operation in the photoelectric conversion apparatus 100 will be described. FIG. 3 exemplarily shows a timing chart of the operation of reading out signals from the pixel array 101. Here, the operation of reading out signals from the pixel 102 in the jth row by the vertical scanning unit 103 is representatively shown. Note that signals shown in FIG. 3 are high-active signals.

At time t301, a horizontal synchronization signal SYNC is activated to high level, and the row selection signal $PSEL(j)$ of the jth row is activated to high level. If the row selection signal $PSEL(j)$ is set at high level, the selection transistor 205 of the pixel 102 in the selected row is set in the ON state, and the pixel 102 in the selected row is electrically connected to the column signal line 110.

At time t302, the reset control signal PRES(j) is activated to high level. This sets the reset transistor 203 of the pixel 102 in the ON state, and the floating diffusion FD is reset to the reset potential corresponding to a power supply potential VDD.

At time t303, the reset control signal PRES(j) is inactivated to low level, and the reset transistor 203 is set in the OFF state. Thus, the reset of the potential of the floating diffusion FD is released. Since the selection transistor 205 is kept in the ON state, a signal corresponding to the gate potential of the amplification transistor 204 at the time of release of the reset of the potential of the floating diffusion FD is output to the column signal line 110. In the period from time t303 to time t306, a noise level (N level) is output from the pixel 102 to the column signal line 110.

In the period from time t304 to time t305, the noise level output to the column signal line 110 can be read out as a digital signal by the readout circuit 105. The digital signal of the noise level read out by the readout circuit 105 is stored in the memory unit 106. The operation performed in the period from time t304 to time t305, that is, the operation of converting the noise level into the digital signal is referred to as N conversion.

At time t306, the transfer control signal PTX(j) is activated to high level. This sets the transfer transistor 202 of the pixel 102 in the ON state, and electric charges generated by photoelectric conversion in the photoelectric conversion element 201 are transferred to the floating diffusion FD. A signal corresponding to the electric charges generated in the photoelectric conversion element 201 is output to the column signal line 110. In the period from time t306 to time t310, an optical signal level (S level) is output from the pixel 102 to the column signal line 110.

At time t307, the transfer control signal PTX(j) is inactivated to low level. This sets the transfer transistor 202 in the OFF state. Even after the transfer transistor 202 is set in the OFF state, the optical signal level continues to be output to the column signal line 110.

In the period from time t308 to time t309, the optical signal level output to the column signal line 110 is read out as a digital signal by the readout circuit 105. The digital signal of the optical signal level read out by the readout circuit 105 is stored in the memory unit 106. The operation performed in the period from time t308 to time t309, that is, the operation of converting the optical signal level into the digital signal is referred to as S conversion.

In the period from time t310 to time t311, in accordance with a horizontal scanning pulse signal output from the horizontal scanning unit 107, a pair of the noise level and the optical signal level held in the memory unit 106 is output from the memory unit 106 to the signal processing unit 108. By repeating the horizontal scanning until the last column, readout of pairs of the noise levels and the optical signal levels of the pixels 102 for one row arranged in the readout target row is completed. The signal processing unit 108 includes a CDS circuit that performs a CDS process of generating a pixel signal by subtracting the noise level from the optical signal level. The CDS circuit outputs a pixel signal having undergone the CDS process.

Figure 4A:
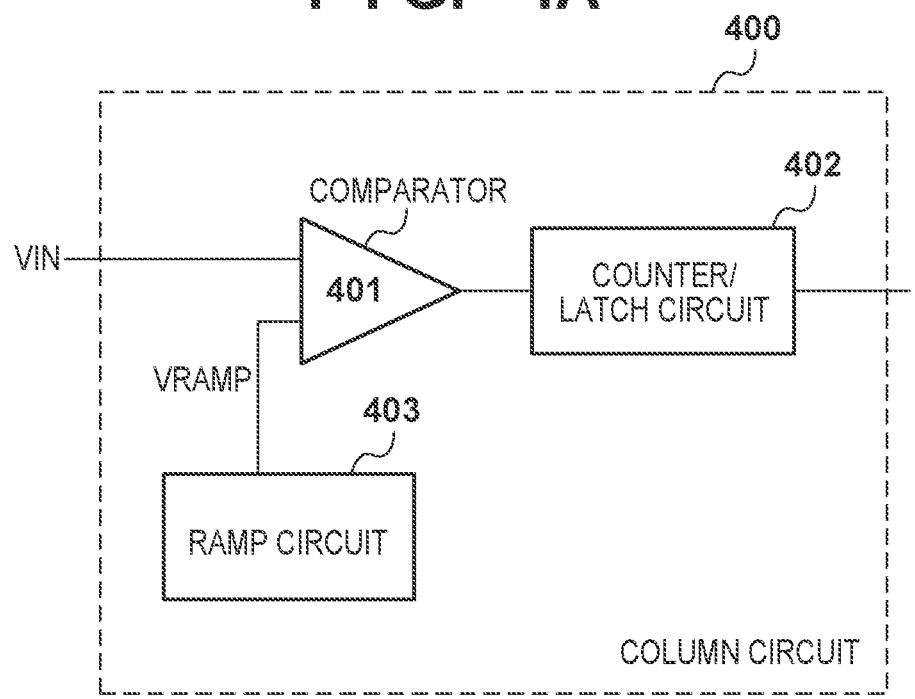
FIGS. 4A and 4B are views for explaining the arrangement and principle of A/D conversion.
Figure 4B:
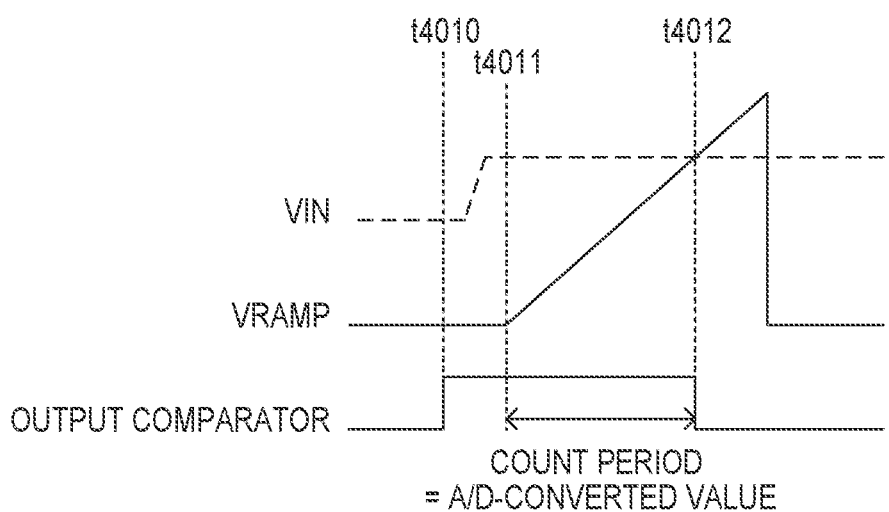

Next, with reference to FIGS. 4A and 4B, the arrangement and principle of A/D conversion performed by the readout circuit 105 will be exemplarily described. The readout circuit 105 includes, for each column, a column circuit 400 including an A/D converter, and the A/D converter can include a comparator 401, a counter/latch circuit 402, and a ramp circuit 403 as exemplarily shown in FIG. 4A. The ramp circuit 403 is a circuit that generates or outputs a reference signal VRAMP (ramp signal) which changes at a constant change rate (time change rate), that is, changes with a constant slope. The comparator 401 compares a signal VIN output from the pixel array 101 to the column signal line 110 with the reference signal VRAMP output from the ramp circuit 403, and outputs the comparison result.

As exemplarily shown in FIG. 4B, prior to the start of readout of the signal VIN output from the pixel array 101, the operation of the comparator 401 is started (time t4010). Once the signal VIN output from the pixel array 101 stabilizes, the count value of the counter/latch circuit 402 is reset at time t4011. In synchronization with the timing of reset of the count value of the counter/latch circuit 402, the level of the reference signal VRAMP output from the ramp circuit 403 increases along with the time elapse from time t4011. If the level of the reference signal VRAMP output from the ramp circuit 403 exceeds the optical signal level of the signal VIN output from the pixel array 101, the output of the comparator 401 is inverted (time t4012). The counter/latch circuit 402 performs a count operation in the period (time t4011 to time t4012) from the reset of the count value to the inversion of the output of the comparator 401. With this operation, the count value proportional to the level of the signal output from the pixel array 101 can be obtained, and the obtained count value serves as the result of A/D conversion. Note that the method of comparing the signal from the pixel array 101 with the reference signal, the comparison method by the counter/latch circuit, and the like described here are merely examples, and other methods may be used as long as the period from the reset of the count value to the inversion of the output of the comparator 401 can be detected.

Figure 5:
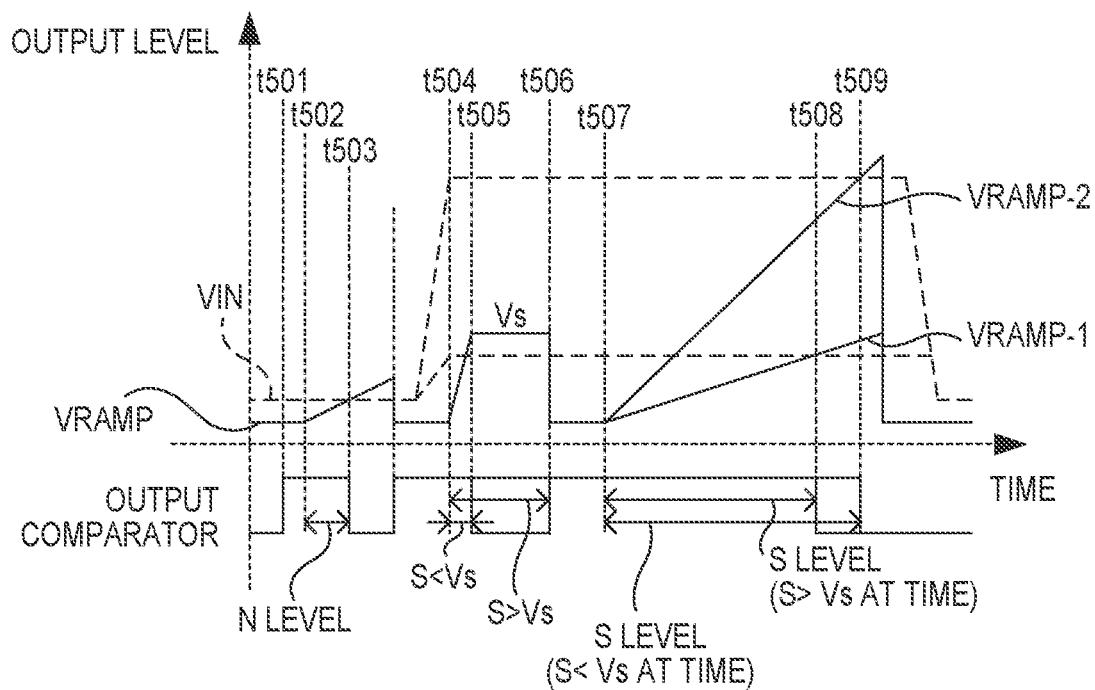
FIG. 5 is a view exemplarily showing the operation of a column circuit in the first embodiment.

FIG. 5 exemplarily shows the operation of one column circuit 400 in the readout circuit 105 according to the first embodiment. In FIG. 5, the abscissa exemplarily represents time, the ordinate in the upper stage exemplarily represents the level of the reference signal and the level of the signal from the pixel array 101, and the ordinates in the lower stage exemplarily represents the output of the comparator 401. Here, an example will be described in which the change rate (slope) of the reference signal VRAMP output from the ramp circuit 403 is changed in accordance with the level of the signal VIN output from the pixel array 101. The ramp circuit 403 can selectively generate or output a first reference signal VRAMP-1 which changes at a first change rate, a second reference signal VRAMP-2 which changes at a second change rate whose change rate (slope) is larger than the first range rate, and a determination reference signal.

First, in order to perform A/D conversion of the noise level (N level), the operation of the comparator 401 is started at time t501. The count of the counter/latch circuit 402 is reset at time t502, and the level of the reference signal VRAMP output from the ramp circuit 403 is changed at the first change rate. Since the noise level is small, the first reference signal VRAMP-1 (first ramp signal) having a small slope is used for A/D conversion of the noise level. The counter/latch circuit 402 performs the count operation in the period (time t502 to time t503) from the reset of the count to the inversion of the output of the comparator 401. With this, the noise level is A/D-converted.

Then, in the level determination period, the column circuit 400 determines the optical signal level which is the signal corresponding to electric charges accumulated in the photoelectric conversion element 201 in the pixel 102 in the pixel array 101. In the level determination period, the ramp circuit 403 outputs, to the comparator 401, the determination reference signal with a determination level Vs as the maximum level. The determination level Vs is a threshold value for determination. The comparator 401 compares the signal VIN output from the pixel array 101 with the determination reference signal. Here, the count value of the counter/latch circuit 402 is reset at time t504, and the ramp circuit 403 starts to output the determination reference signal. If the level of the signal VIN (optical signal level) output from the pixel array 101 is larger than the determination level Vs (S>Vs), the output of the comparator 401 is not inverted, so that the count value continues to increase until the level determination period ends at time t506. On the other hand, if the level of the signal VIN output from the pixel array 101 is smaller than the determination level Vs (S<Vs), for example, the output of the comparator 401 is inverted at time t505, so that the count value stops increasing. In this manner, based on the count value of the counter/latch circuit 402, the column circuit 400 can determine whether the optical signal level is larger or smaller than the determination level Vs.

The column circuit 400 supplies the result of determination as to whether the optical signal level is larger or smaller than the determination level Vs to the memory unit 106 as luminance determination information (luminance determination information LL to be described later). The luminance determination information is stored in the memory unit 106 while being associated with the digital signal generated by the column circuit 400. The luminance determination information can be, for example, information which has a value 1 (=high) if the optical signal level (S) is larger than the determination level Vs (S>Vs), and has a value 0 (=low) if the optical signal level is smaller than the determination level Vs (S<Vs). Note that it may be controlled such that the timing of resetting the count value of the counter/latch circuit 402 is the time at which the output of the ramp circuit 403 stabilizes at the determination level Vs, and the count value becomes 0 if the optical signal level (S) is smaller than the determination level Vs (S<Vs).

If the optical signal level (S) is smaller than the determination level Vs (S<Vs), from time t507, the optical signal level can be A/D-converted using the first reference signal VRAMP-1 as in A/D conversion of the noise level. With this, in the example shown in FIG. 5, the count value can be obtained in the period from time t507 to time t508. On the other hand, if the optical signal level (S) is larger than the determination level Vs, the optical signal level can be A/D-converted using the second reference signal VRAMP-2 which changes at the second change rate that is a times the first change rate of the first reference signal VRAMP-1. With this, in the example shown in FIG. 5, the count value can be obtained in the period from time t507 to time t509. Here, the first change rate of the first reference signal VRAMP-1 and the second change rate of the second reference signal VRAMP-2 can be understood as the gains of readout by the readout circuit 105, and correspond to the first gain and the second gain, respectively. That is, readout of the signal from the pixel array 101 using the first reference signal VRAMP-1 corresponds to readout of the signal from the pixel array 101 with the first gain. Further, readout of the signal from the pixel array 101 using the second reference signal VRAMP-2 corresponds to readout of the signal from the pixel array 101 with the second gain. That is, the readout circuit 105 has a function of reading out a signal of the pixel array 101 with the first gain, and a function of reading out a signal of the pixel array 101 with the second gain different from the first gain.

Figure 6:
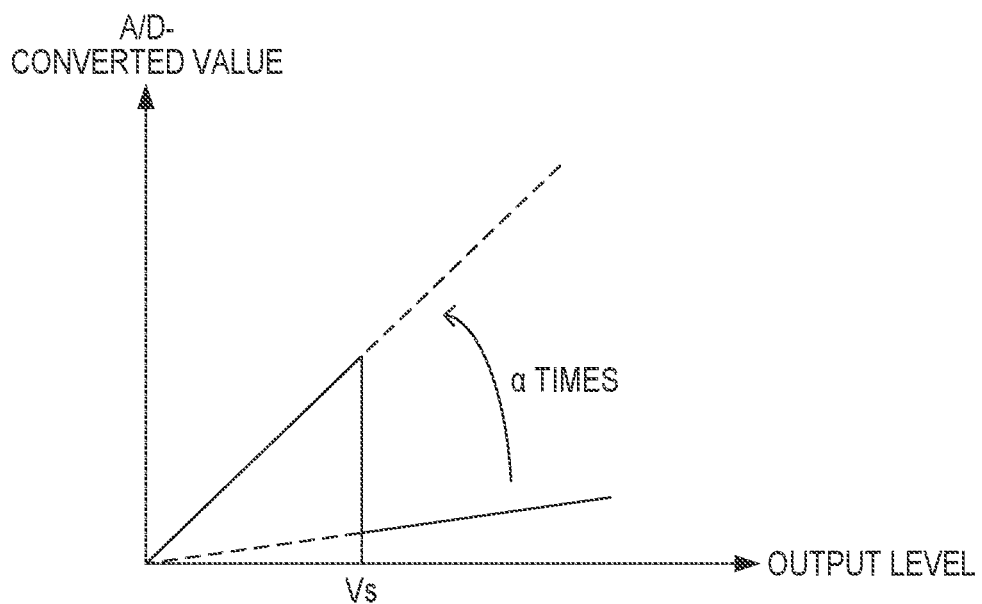
FIG. 6 is a view exemplarily showing the relationship between an optical signal level and the result of A/D conversion in a case in which the change rate (slope) of a reference signal is changed in accordance with the optical signal level.

FIG. 6 exemplarily shows the relationship between the optical signal level and the result of A/D conversion in a case in which the change rate (slope) of the reference signal is changed in accordance with the optical signal level. The abscissa of FIG. 6 represents the optical signal level output from the pixel array 101, and the ordinate represents the result (A/D-converted value) of A/D conversion of the optical signal level. The solid line indicates the digital value (A/D-converted value) having undergone A/D conversion by the comparator 401 and the counter/latch circuit 402 and supplied to the signal processing unit 108 via the horizontal scanning unit 107. As has been described above, the optical signal level having a value smaller than the determination level Vs is A/D-converted using the first reference signal VRAMP-1, and the optical signal level having a value larger than the determination level Vs is A/D-converted using the second reference signal VRAMP-2. Therefore, as shown in FIG. 6, the optical signal level after A/D conversion becomes discontinuous before and after the determination level Vs.

To solve this problem, the signal processing unit 108 multiplies the A/D-converted value of the optical signal level larger than the determination level Vs by a ratio α, which is the ratio (second change rate/first change rate) of the first change rate of the first reference signal VRAMP-1 and the second change rate of the second reference signal VRAMP-2.

Subsequently, the principle of the basic reset noise removal process performed in the signal processing unit 108 will be described. The A/D-converted optical signal level described with reference to FIG. 5 includes not only the signal component corresponding to the electric charges accumulated in the photoelectric conversion element 201 of the pixel 102 in the pixel array 101, but also a noise component such as reset noise due to the reset transistor 203. On the other hand, the A/D-converted noise level described with reference to FIG. 5 includes a noise component such as reset noise due to the reset transistor 203. Therefore, by performing the CDS process of subtracting the A/D-converted noise level from the A/D-converted optical signal level, it is possible to reduce the reset noise from the optical signal level.

If the optical signal level is smaller than the determination level Vs, reset noise removal by the CDS process can be expressed as:

$$(SL+NL+DL(T2))-(NL+DL(T1))=SL+DL(T2)-DL(T1) \quad (1)$$

In equation (1), SL is the optical signal level having undergone A/D conversion using the first reference signal VRAMP-1, and NL is the noise level having undergone A/D conversion using the first reference signal VRAMP-1. Further, in equation (1), each of DL(T2) and DL(T1) is a value obtained by converting, into an error component, the amount of response delay of the comparator 401 in a case of using the first reference signal VRAMP-1. The amount of response delay corresponds to the time from the timing at which the value of the signal output from the pixel array 101 exceeds the value of the first reference signal VRAMP-1 to the inversion of the output of the comparator 401 in response thereto. This amount of response delay appears as an error in the result of A/D conversion. DL(T) is expressed as a function of T because it has dependency on the time (T) of A/D conversion. T1 is the time when the noise level is A/D-converted using the first reference signal VRAMP-1, and T2 is the time when the optical signal level is A/D-converted using the first reference signal VRAMP-1.

DL(T2)−DL(T1), which is the influence of the amount of response delay of the comparator 401, cannot be reduced by the CDS process. Since DL(T2)−DL(T1) has dependency on the time T of A/D conversion, it appears as a contrast changing in the vertical direction (column direction) in an image output from the photoelectric conversion apparatus 100. This is referred to as vertical shading. The vertical shading is corrected by the signal processing unit 108.

On the other hand, if the optical signal level is larger than the determination level Vs, reset noise removal by the CDS process can be expressed as:

$$\alpha \times (SH+NH+DH(T3))-(NL+DL(T1))=\alpha SH+\alpha DH(T3)-DL(T1) \quad (2)$$

In equation (2), SH is the optical signal level having undergone A/D conversion using the second reference signal VRAMP-2, and NH is the noise level having undergone A/D conversion using the second reference signal VRAMP-2. Further, in equation (2), DH(T3) is a value obtained by converting, into an error component, the amount of response delay of the comparator 401 in a case of using the second reference signal VRAMP-2. The amount of response delay corresponds to the time from the timing at which the value of the signal output from the pixel array 101 exceeds the value of the second reference signal VRAMP-2 to the inversion of the output of the comparator 401 in response thereto. This amount of response delay appears as an error in the result of A/D conversion. Since $\alpha$NH and NL of the left-hand side of equation (2) indicate the same noise level, it can be regarded that NL=$\alpha$NH. However, the reference signal for A/D conversion of the optical signal level and the reference signal for A/D conversion of the noise level are different, and the time of A/D conversion is also different. Therefore, $\alpha$DH(T3)−DL(T1), which is the influence of the amount of response delay of the comparator 401, cannot be reduced by the CDS process. Since $\alpha$DH(T3)−DL(T1) has dependency on the time T of A/D conversion, it appears as a contrast changing in the vertical direction (column direction) in an image output from the photoelectric conversion apparatus 100. This is referred to as vertical shading. The vertical shading is corrected by the signal processing unit 108.

The first embodiment provides a function of removing or reducing the influence of vertical shading in the photoelectric conversion apparatus 100 that includes the readout circuit 105 which reads out signals from the pixel array 101 with a gain selected from a plurality of gains. With reference to FIGS. 7 to 9, the arrangement and operation of the photoelectric conversion apparatus 100 according to the first embodiment will be described below.

FIG. 7 exemplarily shows the arrangement of the pixel array 101. The pixel array 101 includes an effective pixel region 702 for generating a pixel signal or an image signal by photoelectric conversion. The effective pixel region 702 is a region where the plurality of pixels (effective pixels) 102 are arranged so as to form the plurality of rows and the plurality of columns. The pixel array 101 can further include a first reference pixel region 703 and a second reference pixel region 704. In the reference pixel regions 703 and 704, a plurality of reference pixels, each of which outputs a noise level, can be arranged. In the first reference pixel region 703, a plurality of reference pixels can be arranged so as to form at least one column, and preferably a plurality of columns. Similarly, in the second reference pixel region 704, a plurality of reference pixels can be arranged so as to form at least one column, and preferably a plurality of columns. The reference pixel can have an arrangement obtained by, for example, removing the photoelectric conversion element from the pixel 102. The reference pixel is shielded from light by a light shielding film. The reference pixel can be used to generate a correction value for removing or reducing the influence of vertical shading described above. The first reference pixel region 703 can be used to generate the first correction value for correcting the pixel signal output from the pixel 102 which has output an optical signal level smaller than the determination level Vs, and having undergone a CDS process. The second reference pixel region 704 can be used to generate the second correction value for correcting the pixel signal output from the pixel 102 which has output an optical signal level larger than the determination level Vs, and having undergone a CDS process. The pixel array 101 can further include an Optical Black (OB) pixel region 701. A plurality of OB pixels, each of which outputs an OB level, are arranged in the OB pixel region 701. The OB pixel can be, for example, a pixel having the same arrangement as that of the pixel 102 but covered with a light shielding film. The OB pixel region 701 can include multiple OB pixels connected to the plurality of column signal lines 110 arranged in the effective pixel region 702, and multiple OB pixels connected to the plurality of row selection lines 109 arranged in the effective pixel region 702.

In the photoelectric conversion apparatus 100 according to the first embodiment, a calibration operation for generating a correction value used to correct vertical shading, and an image capturing operation for generating an image by photoelectric conversion are executed. In the calibration operation, the readout circuit 105 reads out signals from the reference pixels in the reference pixel regions 703 and 704, and the signal processing unit 108 processes the signals. Thus, the first and second correction values can be generated.

In the first embodiment, the first correction value is generated by processing a signal obtained by reading out a noise level from the first reference pixel region 703 by the readout circuit 105. Further, in the first embodiment, the second correction value is generated by processing a signal obtained by reading out a noise level from the second reference pixel region 704 by the readout circuit 105.

Figure 8A:
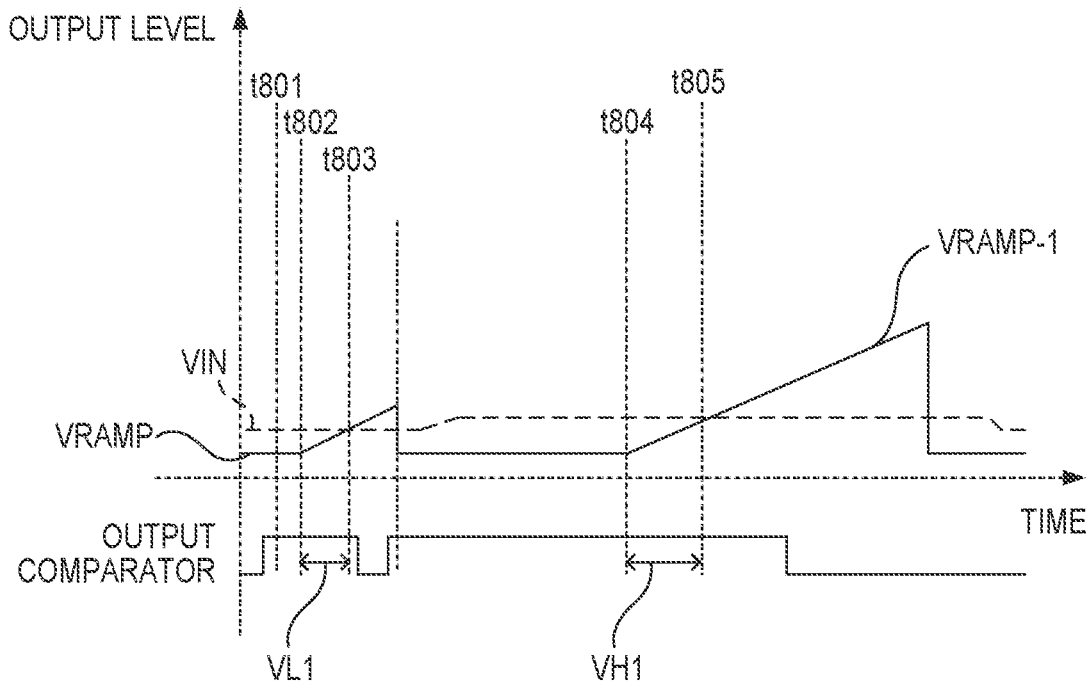
FIGS. 8A and 8B are views exemplarily showing an operation of reading out a signal from a reference pixel region in a calibration operation according to the first embodiment.
Figure 9:
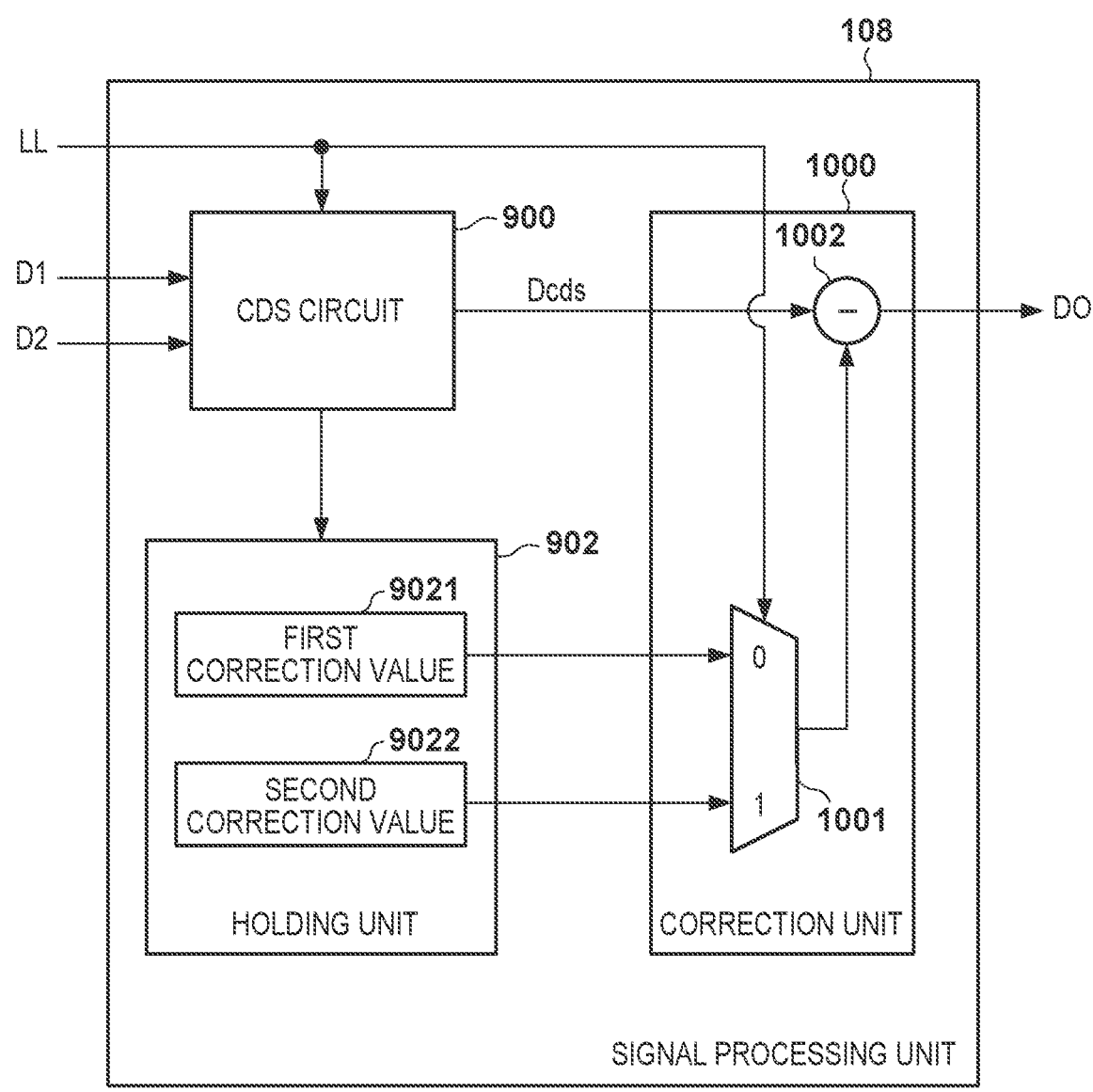
FIG. 9 is a view exemplarily showing the arrangement of a signal processing unit in the first embodiment.

FIG. 8A exemplarily shows an operation of reading out a signal from the reference pixel in the first reference pixel region 703 in the calibration operation. First, an operation of A/D-converting a predetermined voltage (here, a predetermined voltage VL1 for the sake of descriptive convenience) by the column circuit 400 of the readout circuit 105 is performed. More specifically, the operation of the comparator 401 is started at time t801. At time t802, the count of the counter/latch circuit 402 is reset, and the first reference signal VRAMP-1, which changes at the first change rate, is supplied from the ramp circuit 403 to the comparator 401. By performing a count operation in the period (time t802 to time t803) from the reset of the count of the counter/latch circuit 402 to the inversion of the output of the comparator 401, the predetermined voltage VL1 is A/D-converted.

Then, a predetermined voltage (here, a predetermined voltage VH1 for the sake of descriptive convenience) is A/D-converted. More specifically, at time t804, the count of the counter/latch circuit 402 is reset, and the first reference signal VRAMP-1 is supplied from the ramp circuit 403 to the comparator 401. By performing the count operation in the period (time t804 to time t805) from the reset of the count of the counter/latch circuit 402 to the inversion of the output of the comparator 401, the predetermined voltage VH1 is A/D-converted.

Figure 8B:
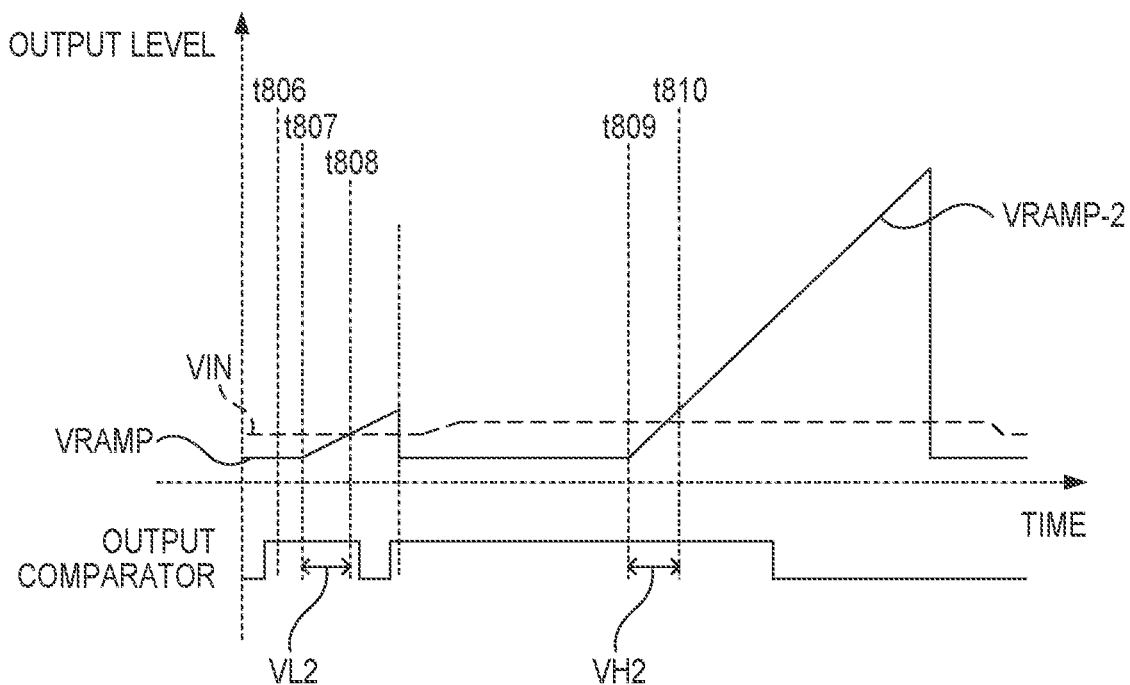

FIG. 8B exemplarily shows an operation of reading out a signal from the reference pixel in the second reference pixel region 704 in the calibration operation. First, an operation of A/D-converting a predetermined voltage (here, a predetermined voltage VL2 for the sake of descriptive convenience) by the column circuit 400 of the readout circuit 105 is performed. More specifically, the operation of the comparator 401 is started at time t806. At time t807, the count of the counter/latch circuit 402 is reset, and the first reference signal VRAMP-1, which changes at the first change rate, is supplied from the ramp circuit 403 to the comparator 401. By performing the count operation in the period (time t807 to time t808) from the reset of the count of the counter/latch circuit 402 to the inversion of the output of the comparator 401, the predetermined voltage VL2 is A/D-converted.

Then, a predetermined voltage (here, a predetermined voltage VH2 for the sake of descriptive convenience) is A/D-converted. More specifically, at time t809, the count of the counter/latch circuit 402 is reset, and the second reference signal VRAMP-2 is supplied from the ramp circuit 403 to the comparator 401. By performing the count operation in the period (time t809 to time t810) from the reset of the count of the counter/latch circuit 402 to the inversion of the output of the comparator 401, the predetermined voltage VH2 is A/D-converted. As has been described above, the second reference signal VRAMP-2 is a ramp signal which changes at the second change rate that is α times the first change rate of the first reference signal VRAMP-1.

FIG. 9 exemplarily shows an arrangement example of the signal processing unit 108. The signal processing unit 108 can include a CDS circuit 900 that performs a CDS process on a pair of digital signals provided from the pixel array 101 (effective pixel, reference pixel, or OB pixel) via the column signal line 110, the readout circuit 105, and the memory unit 106. Here, in the image capturing operation, when reading out signals from the effective pixel, the pair of digital signals supplied to the CDS circuit 900 is composed of the digital signal of the noise level and the digital signal of the optical signal level. In the image capturing operation, when reading out signals from the OB pixel, the pair of digital signals supplied to the CDS circuit 900 is composed of the digital signal of the reset level and the digital signal of the dark level which is read out while setting the transfer transistor 202 in the ON state.

In the calibration operation, signals are read out from the reference pixels in the first reference pixel region 703 and the second reference pixel region 704. The readout circuit 105 can perform readout of the signal from the reference pixel in the first reference pixel region 703 and readout of the signal from the reference pixel in the second reference pixel region 704 in parallel, that is, simultaneously.

First, a process of generating the first correction values for one column (n pieces) by reading out signals from the reference pixels in the first reference pixel region 703 will be described. As has been described with reference to FIG. 8A, the pair of digital signals supplied to the CDS circuit 900 is composed of a first digital signal D1 read out with the first gain (first reference signal VRAMP-1) and a second digital signal D2 read out with the first gain. The first digital signal D1 can be expressed as NL+DL(T1). The second digital signal D2 can be expressed as NL+DL(T2). Accordingly, an output of the CDS circuit 900 can be expressed as:

$$(NL+DL(T2))-(NL+DL(T1))=DL(T2)-DL(T1) \quad (3)$$

The right-hand side of equation (3) corresponds to DL(T2)−DL(T1) which is vertical shading to be removed in the right-hand side of equation (1). That is, when signals read out from the first reference pixel region 703 are input in the calibration operation, the CDS circuit 900 outputs DL(T2)−DL(T1). DL(T2)−DL(T1) can be used as the first correction value for correcting the pixel signal read out from the pixel 102 which has output an optical signal level smaller than the determination level Vs, and having undergone a CDS process by the CDS circuit 900. In other words, DL(T2)−DL(T1) can be used as the first correction value for correcting the pixel value read out from the pixel 102 which has output an optical signal level with the luminance determination information LL of 0, and having undergone the CDS process by the CDS circuit 900.

The signal processing unit 108 may include a holding unit 902, and the holding unit 902 can include a first holding region 9021 for holding at least the first correction values for one column (n pieces). Here, multiple pairs of digital signals may be acquired by reading out signals multiple times from each reference pixel in the first reference pixel region 703, and the average value of multiple first provisional correction values obtained by supplying the multiple pairs of digital signals to the CDS circuit 900 may be used as the first correction value. Alternatively, if the first reference pixel region 703 includes the plurality of columns of reference pixels, the average value of multiple first provisional correction values obtained from the plurality of columns of reference pixels may be used as the first correction value. Alternatively, a value obtained by performing filter processing on a plurality of first provisional correction values obtained from the plurality of reference pixels in the first reference pixel region 703 may be used as the first correction value. The CDS circuit 900 can also be understood as a generation circuit that generates the first correction value.

Next, a process of generating the second correction values for one column (n pieces) by reading out signals from the reference pixels in the second reference pixel region 704 will be described. As has been described with reference to FIG. 8B, the pair of digital signals is composed of the first digital signal D1 read out with the first gain (first reference signal VRAMP-1) and the second digital signal D2 read out with the second gain (second reference signal VRAMP-2). The first digital signal D1 can be expressed as NL+DL(T1). The second digital signal D2 can be expressed as NL+DH(T3). Accordingly, an output of the CDS circuit 900 can be expressed as:

$$\alpha \times (NH+DH(T3))-(NL+DL(T1))=\alpha DH(T3)-DL(T1) \quad (4)$$

The right-hand side of equation (4) corresponds to αDH(T3)−DL(T1) which is vertical shading to be removed in the right-hand side of equation (2). That is, when signals read out from the second reference pixel region 704 are input in the calibration operation, the CDS circuit 900 outputs αDH(T3)−DL(T1). αDH(T3)−DL(T1) can be used as the second correction value for correcting the pixel signal read out from the pixel 102 which has output an optical signal level larger than the determination level Vs, and having undergone a CDS process by the CDS circuit 900. In other words, αDH(T3)−DL(T1) can be used as the second correction value for correcting the pixel value read out from the pixel 102 which has output an optical signal level with the luminance determination information LL of 1, and having undergone the CDS process by the CDS circuit 900.

The holding unit 902 of the signal processing unit 108 can include a second holding region 9022 for holding at least the second correction values for one column (n pieces). Here, multiple pairs of digital signals may be acquired by reading out signals multiple times from each reference pixel in the second reference pixel region 704, and the average value of multiple second provisional correction values obtained by supplying the multiple pairs of digital signals to the CDS circuit 900 may be used as the second correction value. Alternatively, if the second reference pixel region 704 includes the plurality of columns of reference pixels, the average value of multiple second provisional correction values obtained from the plurality of columns of reference pixels may be used as the second correction value. Alternatively, a value obtained by performing filter processing on a plurality of second provisional correction values obtained from the plurality of reference pixels in the second reference pixel region 704 may be used as the second correction value. The CDS circuit 900 can also be understood as a generation circuit that generates the second correction value.

The signal processing unit 108 can include a correction unit 1000 that corrects, using the first correction value or the second correction value provided from the holding unit 902, the signal (corresponding to the right-hand side of equation (1) or equation (2)) output from the CDS circuit 900 in the image capturing operation. The correction unit 1000 can include a selection unit 1001 and a subtractor 1002. In the image capturing operation, the CDS circuit 900 is provided with the pair of digital signals read out from the effective pixel or OB pixel via the column signal line 110 by the readout circuit 105 and stored in the memory unit 106, and the luminance determination information LL. The CDS circuit 900 supplies, to the correction unit 1000, a signal (corresponding to the right-hand side of equation (1) or equation (2)) Dcds obtained by performing the CDS process on the pair of digital signals, and the signal Dcds is supplied to the subtractor 1002.

The holding unit 902 can supply, to the selection unit 1001, the first correction value (corresponding to the right-hand side of equation (3)) corresponding to the pair of digital signals among a plurality of first correction values stored in the first holding region 9021. The holding unit 902 can also supply, to the selection unit 1001, the second correction value (corresponding to the right-hand side of equation (4)) corresponding to the pair of digital signals among a plurality of second correction values stored in the second holding region 9022. If the luminance determination information LL corresponding to the pair of digital signals is 0, the selection unit 1001 supplies, to the subtractor 1002, the first correction value supplied from the first holding region 9021. If the luminance determination information LL is 1, the selection unit 1001 supplies, to the subtractor 1002, the second correction value supplied from the second holding region 9022. The correction unit 1000 performs calculation of subtracting, from the signal Dcds supplied from the CDS circuit 900, the first or second correction value supplied from the selection unit 1001, and outputs the result as a pixel signal DO. This calculation can be expressed as equation (55) if the luminance determination information LL is 0, and can be expressed as equation (B6) if the luminance determination information LL is 1.

$$SL+DL(T2)-DL(T1)-(DL(T2)-DL(T1))=SL \quad (5)$$

$$\alpha SH+\alpha DH(T3)-DL(T1)-(\alpha DH(T3)-DL(T1))=\alpha SH \quad (6)$$

That is, for the CDS process (correlated double sampling), the readout circuit 105 reads out the noise level with the first gain from the effective pixel selected from the plurality of effective pixels, and reads out the optical signal level with the first gain or the second gain. In shading correction, the pixel signal of the effective pixel from which the optical signal level has been read out with the first gain is corrected based on the first correction value, and the pixel signal of the effective pixel from which the optical signal level has been read out with the second gain is corrected based on the second correction value.

Vertical shading can change depending on temperature. Therefore, it is preferable to execute the calibration operation at an arbitrary timing or a timing planned in advance. Alternatively, the first correction value and the second correction value may be generated in each frame (vertical scanning period), and the signal Dcds may be corrected based on the first correction value and the second correction value in the same frame (vertical scanning period). The first correction value and the second correction value may be generated outside the photoelectric conversion apparatus 100, and provided to the photoelectric conversion apparatus 100 or the holding unit 902.

Figure 10:
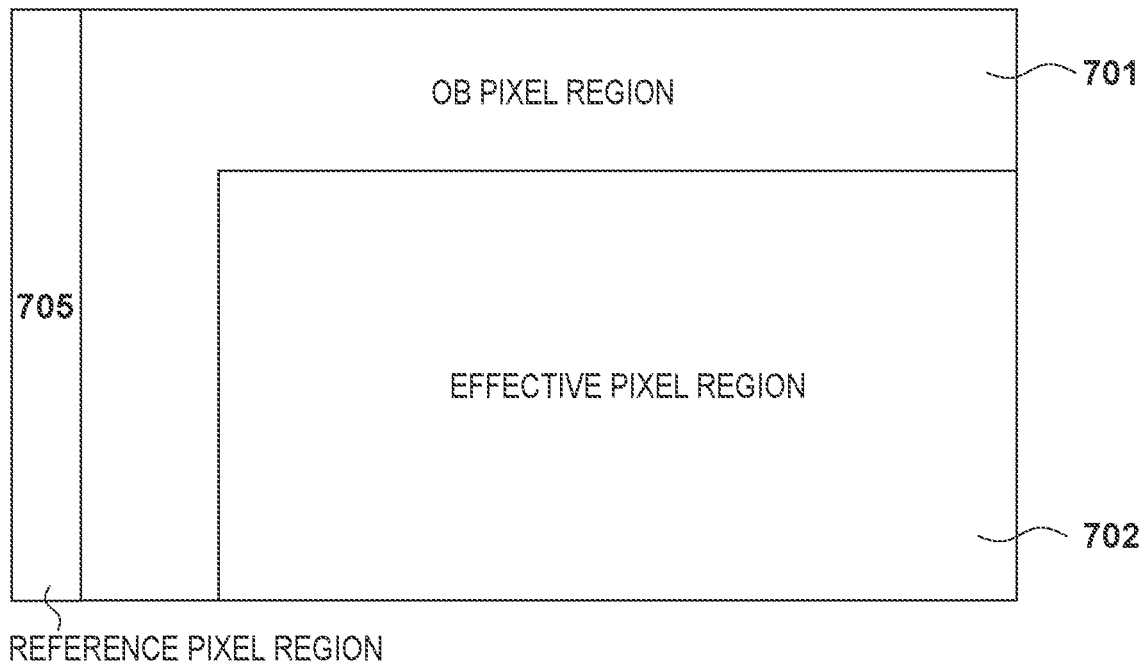
FIG. 10 is a view exemplarily showing the arrangement of a pixel array in the second embodiment.
Figure 11:
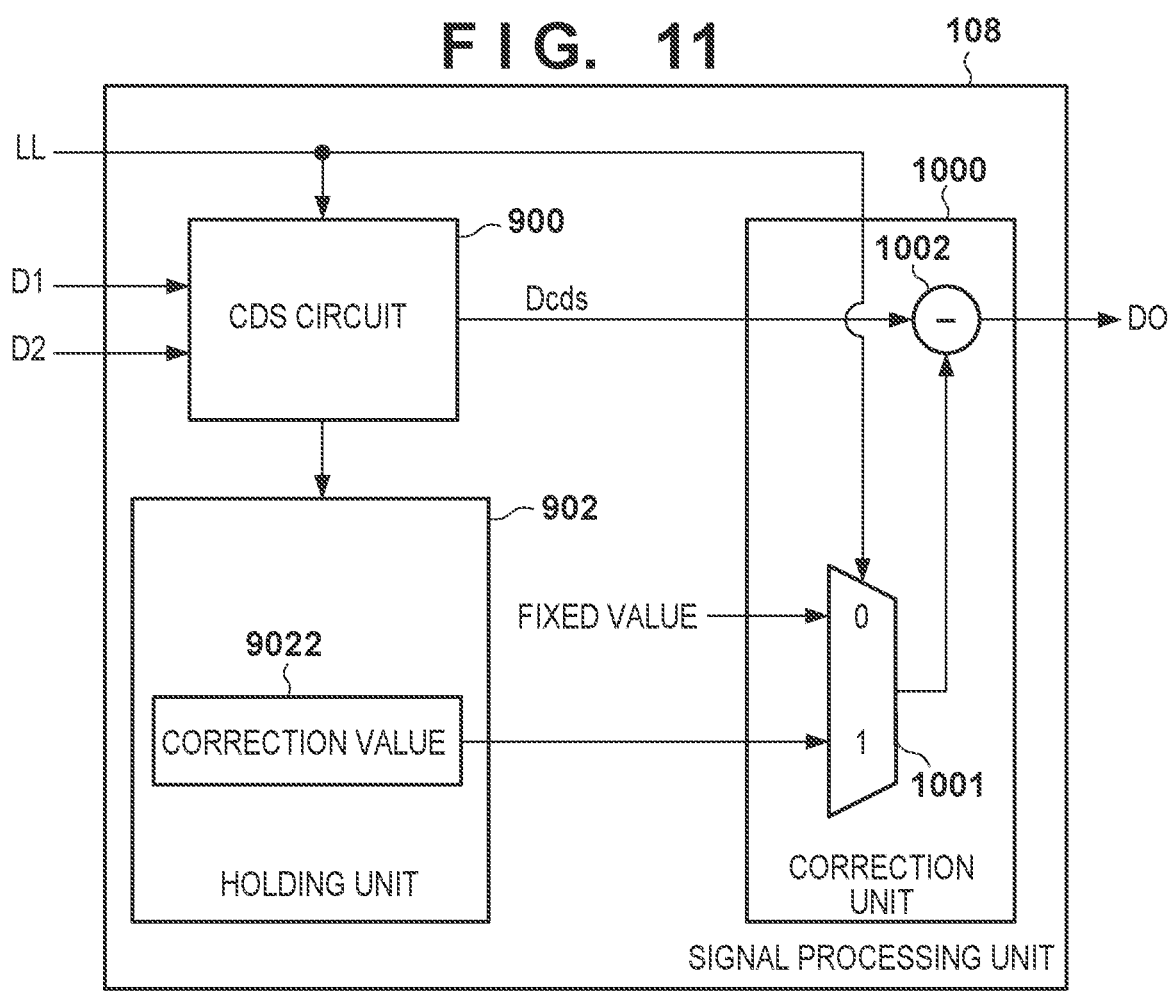
FIG. 11 is a view exemplarily showing the arrangement of a signal processing unit in the second embodiment.

With reference to FIGS. 10 and 11, the arrangement and operation of a photoelectric conversion apparatus 100 according to the second embodiment will be described below. Matters not mentioned as the second embodiment can follow the first embodiment. The photoelectric conversion apparatus 100 according to the second embodiment has an arrangement obtained by removing the first reference pixel region 703 and the first holding region 9021 from the photoelectric conversion apparatus 100 according to the first embodiment, and replacing the first correction value with a fixed value. The second embodiment is useful in a case in which DL(T2)−DL(T1) in equation (1) described in the first embodiment is negligible. In other words, the photoelectric conversion apparatus 100 of the second embodiment does not correct vertical shading if luminance determination information LL is 0.

As exemplarily shown in FIG. 10, in the second embodiment, the first reference pixel region 703 and the second reference pixel region 704 in the first embodiment are replaced with a reference pixel region 705. The reference pixel region 705 in the second embodiment of the third disclosure corresponds to the second reference pixel region 704 in the first embodiment. FIG. 11 shows an arrangement example of a signal processing unit 108 of the second embodiment. The signal processing unit 108 can include a CDS circuit 900 that performs a CDS process on a pair of digital signals provided from a pixel array 101 (effective pixel, reference pixel, or OB pixel) via a column signal line 110, a readout circuit 105, and a memory unit 106. Here, in an image capturing operation, when reading out signals from the effective pixel, the pair of digital signals supplied to the CDS circuit 900 is composed of the digital signal of the noise level and the digital signal of the optical signal level. In the image capturing operation, when reading out signals from the OB pixel, the pair of digital signals is composed of the digital signal of the reset level and the digital signal of the dark level which is read out while setting a transfer transistor 202 in the ON state.

In a calibration operation, correction values for one column (n pieces) are generated by reading out signals from the reference pixels in the reference pixel region 705. As has been described with reference to FIG. 8B, the pair of digital signals supplied to the CDS circuit 900 in the calibration operation is composed of a first digital signal D1 read out with the first gain and a second digital signal D2 read out with the second gain. The first gain corresponds to a first reference signal VRAMP-1, and the second gain corresponds to a second reference signal VRAMP-2. The first digital signal D1 can be expressed as NL+DL(T1). The second digital signal D2 can be expressed as NL+DH(T3). Accordingly, an output of the CDS circuit 900 can be expressed as equation (4) described above. An output of the CDS circuit 900 in the calibration operation can be used as the correction value for correcting the pixel signal read out from a pixel 102 which has output an optical signal level with the luminance determination information LL of 1, and having undergone a CDS process by the CDS circuit 900. A holding unit 902 of the signal processing unit 108 can include a holding region 9022 for holding at least the correction values for one column (n pieces).

In the image capturing operation, a correction unit 1000 of the signal processing unit 108 corrects the signal (corresponding to the right-hand side of equation (1) or equation (2)) output from the CDS circuit 900 using the fixed value or the second correction value from the holding unit 902. The correction unit 1000 can include a selection unit 1001 and a subtractor 1002. In the image capturing operation, the CDS circuit 900 is provided with a pair of digital signals read out from the effective pixel or OB pixel via the column signal line 110 by the readout circuit 105 and stored in the memory unit 106, and the luminance determination information LL. The CDS circuit 900 supplies, to the correction unit 1000, a signal (corresponding to the right-hand side of equation (1) or equation (2)) Dcds obtained by performing the CDS process on the pair of digital signals, and the signal Dcds is supplied to the subtractor 1002. The holding unit 902 can supply, to the selection unit 1001, the correction value (corresponding to the right-hand side of equation (4)) corresponding to the pair of digital signals among a plurality of correction values (correction values for one column) stored in the holding region 9022. If the luminance determination information LL corresponding to the pair of digital signals is 0, the selection unit 1001 can supply the fixed value to the subtractor 1002. If the luminance determination information LL is 1, the selection unit 1001 can supply, to the subtractor 1002, the correction value supplied from the holding region 9022. The correction unit 1000 performs calculation of subtracting, from the signal Dcds supplied from the CDS circuit 900, the fixed value or correction value supplied from the selection unit 1001, and outputs the result as a pixel signal DO. This calculation can be expressed as equation (7) if the luminance determination information LL is 0, and can be expressed as equation (8) if the luminance determination information LL is 1.

$$SL+DL(T2)-DL(T1)-(\text{fixed value})\fallingdotseq SL \quad (7)$$

$$\alpha SH+\alpha DH(T3)-DL(T1)-(\alpha DH(T3)-DL(T1))=\alpha SH \quad (8)$$

A photoelectric conversion apparatus 100 according to the third embodiment of the third disclosure will be described below. Matters not mentioned as the third embodiment of the third disclosure can follow the first or second embodiment of the third disclosure. In the photoelectric conversion apparatus 100 according to the third embodiment, the pixel array 101 has an arrangement as exemplarily shown in FIG. 10 described in the second embodiment, that is, an arrangement including a single reference pixel region 705. In the third embodiment, a first correction value and a second correction value are generated as in the first embodiment using the single reference pixel region 705.

In a calibration operation in the third embodiment, a first operation of reading out signals from the reference pixel region 705 to generate the first correction value and a second operation of reading out signals from the reference pixel region 705 to generate the second correction value are performed in periods different from each other.

First, a first process of generating the first correction values for one column (n pieces) by reading out signals from the reference pixels in the reference pixel region 705 by a readout circuit 105 will be described. In the first process, as exemplarily shown in FIG. 8A, signals are read out from the reference pixel in the reference pixel region 705 by the readout circuit 105, and a pair of digital signals is supplied to a CDS circuit 9900. The pair of digital signals is composed a first digital signal D1 read out from the reference pixel in the reference pixel region 705 with a first gain (first reference signal VRAMP-1), and a second digital signal D2 read out from the reference pixel in the reference pixel region 705 with the first gain. The first digital signal D1 can be expressed as NL+DL(T1). The second digital signal D2 can be expressed as NL+DL(T2). Accordingly, an output of the CDS circuit 900 corresponds to DL(T2)–DL(T1) as expressed by equation (3) described above. DL(T2)–DL(T1) can be used as the first correction value for correcting the pixel signal read out from a pixel 102 which has output an optical signal level smaller than a determination level Vs, and having undergone a CDS process by the CDS circuit 900. In other words, DL(T2)–DL(T1) can be used as the first correction value for correcting the pixel value read out from the pixel 102 which has output an optical signal level with luminance determination information LL of 0, and having undergone the CDS process by the CDS circuit 900. A holding unit 902 of a signal processing unit 108 can include a first holding region 9021 for holding at least the first correction values for one column (n pieces). Here, multiple pairs of digital signals may be acquired by reading out signals multiple times from each reference pixel in the reference pixel region 705, and the average value of multiple first provisional correction values obtained by supplying the multiple pairs of digital signals to the CDS circuit 900 may be used as the first correction value. Alternatively, if the reference pixel region 705 includes a plurality of columns of reference pixels, the average value of multiple first provisional correction values obtained from the plurality of columns of reference pixels may be used as the first correction value. Alternatively, a value obtained by performing filter processing on a plurality of first provisional correction values obtained from the plurality of reference pixels in the reference pixel region 705 may be used as the first correction value. The CDS circuit 900 can also be understood as a generation circuit that generates the first correction value.

Next, a second process of generating the second correction values for one column (n pieces) by reading out signals from the reference pixels in the reference pixel region 705 by the readout circuit 105 will be described. In the second process, as exemplarily shown in FIG. 8B, signals are read out from the reference pixel in the reference pixel region 705 by the readout circuit 105, and a pair of digital signals is supplied to the CDS circuit 900. The pair of digital signals is composed of the first digital signal D1 read out with the first gain (first reference signal VRAMP-1), and the second digital signal D2 readout with a second gain (second reference signal VRAMP-2). The first digital signal D1 can be expressed as NL+DL(T1). The second digital signal D2 can be expressed as NL+DH(T3). Accordingly, an output of the CDS circuit 900 corresponds to αDH(T3)–DL(T1) as expressed by equation (4) described above. αDH(T3)–DL(T1) can be used as the second correction value for correcting the pixel signal read out from the pixel 102 which has output an optical signal level larger than the determination level Vs, and having undergone a CDS process by the CDS circuit 900. In other words, αDH(T3)–DL(T1) can be used as the second correction value for correcting the pixel value read out from the pixel 102 which has output an optical signal level with the luminance determination information LL of 1, and having undergone the CDS process by the CDS circuit 900. The holding unit 902 of the signal processing unit 108 can include a second holding region 9022 for holding at least the second correction values for one column (n pieces). Here, multiple pairs of digital signals may be acquired by reading out signals multiple times from each reference pixel in the reference pixel region 705, and the average value of multiple second provisional correction values obtained by supplying the multiple pairs of digital signals to the CDS circuit 900 may be used as the second correction value. Alternatively, if the reference pixel region 705 includes a plurality of columns of reference pixels, the average value of multiple second provisional correction values obtained from the plurality of columns of reference pixels may be used as the second correction value. Alternatively, a value obtained by performing filter processing on a plurality of second provisional correction values obtained from the plurality of reference pixels in the reference pixel region 705 may be used as the second correction value. The CDS circuit 900 can also be understood as a generation circuit that generates the second correction value.

The operation of a correction unit 1000 in an image capturing operation in the third embodiment is similar to that in the first embodiment.

If the size of the reference pixel region is the same, the time required for generating the first and second correction values is longer in the third embodiment than in the first embodiment, but the number of data that can be used to generate the first and second correction values is larger in the third embodiment than in the first embodiment. Therefore, the third embodiment is advantageous in reducing the influence of random noise.

Figure 12:
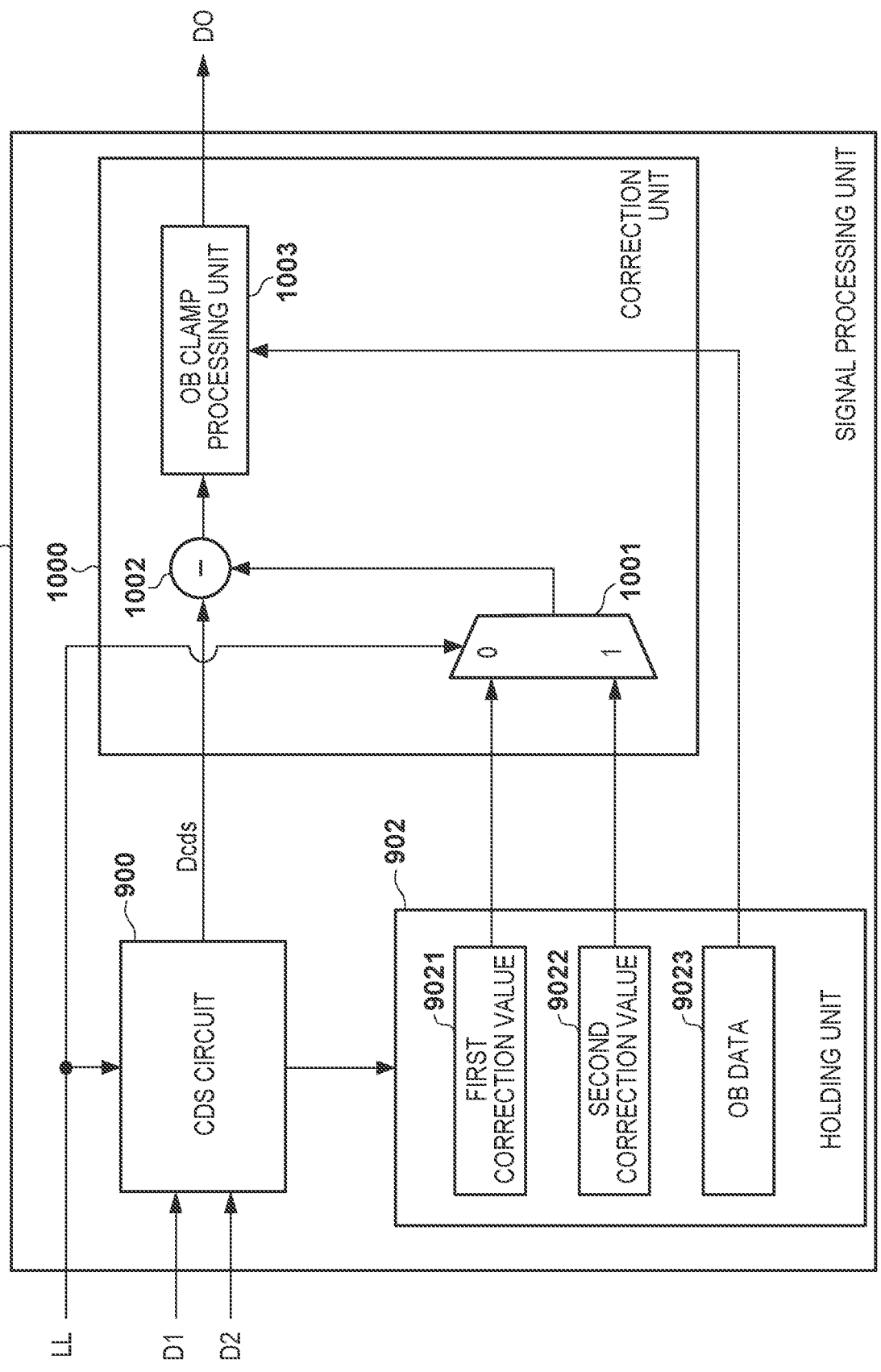
FIG. 12 is a view exemplarily showing the arrangement of a signal processing unit in the fourth embodiment.

With reference to FIG. 12, the arrangement and operation of a photoelectric conversion apparatus 100 according to the fourth embodiment will be described. Matters not mentioned as the fourth embodiment can follow the first to third embodiments of the third disclosure. The fourth embodiment provides an example of the photoelectric conversion apparatus 100 that performs, in addition to correction of vertical shading described above, correction based on signals read out by a readout circuit 105 from a plurality of OB pixels arranged in an OB pixel region 701. In one aspect, the vertical shading described in the first to third embodiments of the third disclosure occurs in A/D conversion. Further, correction based on signals read out from the plurality of OB pixels can be understood as correction of noise components (for example, vertical shading, horizontal shading, fixed pattern noise, and the like) generated in a pixel array 101. Each reference pixel in reference pixel regions 703 and 704 outputs a fixed value or a predetermined voltage to a column signal line 110. On the other hand, each OB pixel in the OB pixel region 701 outputs a signal or voltage corresponding to its characteristics to the column signal line 110. That is, the signals or voltages output from the plurality of OB pixels in the OB pixel region 701 to the column signal lines 110 have variations reflecting the variations in characteristics among the plurality of OB pixels.

FIG. 12 exemplarily shows the arrangement of a signal processing unit 108 of the fourth embodiment. The signal processing unit 108 can perform, in addition to shading correction, by a subtractor 1002, on a signal Dcds output from a CDS circuit 900, correction based on signals read out by the readout circuit 105 from the plurality of OB pixels arranged in the OB pixel region 701. A correction unit 1000 can include, for example, an OB clamp processing unit 1003 in addition to a selection unit 1001 and the subtractor 1002 for correcting the signal Dcds based on a correction value generated using a plurality of reference pixels in the reference pixel regions 703 and 704. The OB clamp processing unit 1003 can be, for example, arranged so as to process the signal output from the subtractor 1002, but may be arranged between the CDS circuit 900 and the subtractor 1002. A holding unit 902 can include a third holding region 9023 for holding OB data to be supplied to the OB clamp processing unit 1003. The OB data can be, for example, data read out from the plurality of OB pixels in the OB pixel region 701 by the readout circuit 105 and having undergone a CDS process by the CDS circuit 900, or data obtained by further processing the CDS-processed data. The OB clamp processing unit 1003 performs an OB clamp process on the pixel signal output from the subtractor 1002 based on the data supplied from the third holding region 9023 in accordance with the position of a pixel 102 related to the signal Dcds (pixel signal), and outputs the result as a pixel signal DO.

Figure 13:
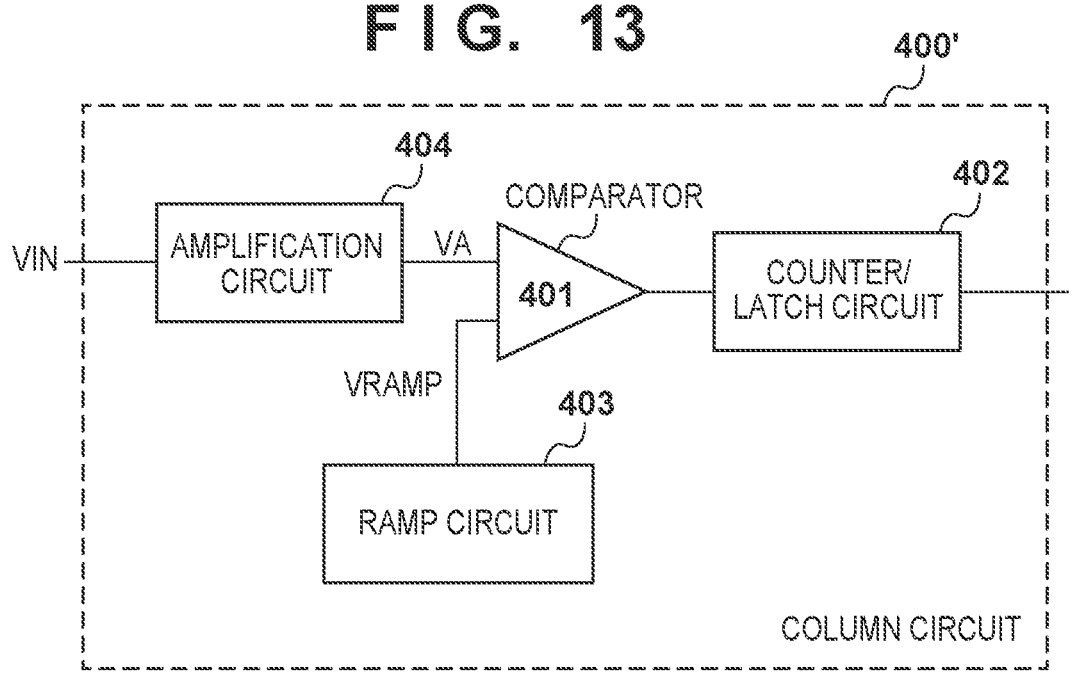
FIG. 13 is a view exemplarily showing the arrangement of a column circuit in the fifth embodiment.

With reference to FIGS. 13 to 15B, a photoelectric conversion apparatus 100 according to the fifth embodiment will be described below. Matters not mentioned as the fifth embodiment can follow the first to fourth embodiments of the third disclosure. FIG. 13 shows an arrangement example of one column circuit 400' of a plurality of column circuits 400' of a readout circuit 105 in the photoelectric conversion apparatus 100 according to the fifth embodiment. In the fifth embodiment, the column circuit 400 in the first embodiment is replaced with the column circuit 400'. The column circuit 400' includes an amplification circuit 404 that amplifies a signal VIN supplied from a pixel array 101 via a column signal line 110. An output VA of the amplification circuit 404 is supplied to a comparator 401. Such an arrangement is advantageous in expansion of the dynamic range and improvement of the S/N ratio.

Figure 14:
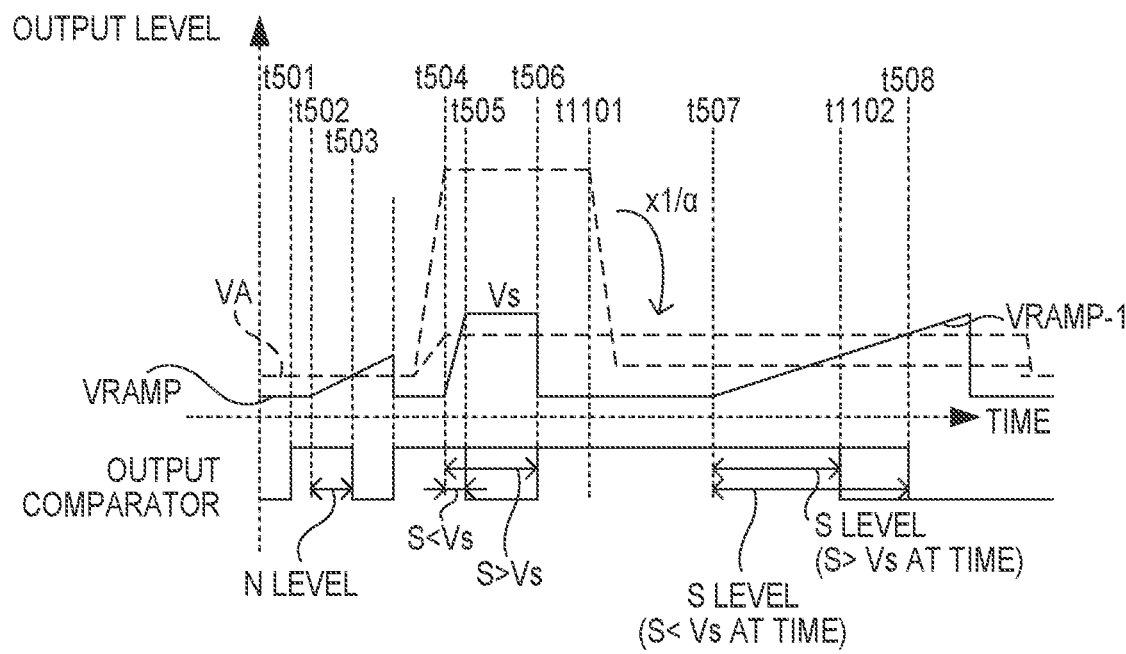
FIG. 14 is a view exemplarily showing the operation of the column circuit in the fifth embodiment.

FIG. 14 exemplarily shows the operation of each column circuit 400' in the readout circuit 105 in the fifth embodiment. In FIG. 14, the abscissa exemplarily represents time, the ordinate in the upper stage exemplarily represents the level of the reference signal and the level of the signal from the pixel array, and the ordinate in the lower stage exemplarily represents the output of the comparator 401. With reference to FIG. 14, an example of changing the gain of the amplification circuit 404 in accordance with the level of the signal VIN from the pixel array 101 will be described. An operation of reading out a noise level and an operation of determining an optical signal level are similar to those in the period from time t501 to time t506 in FIG. 5, so that a description thereof will be omitted. Note that in the period from time t501 to time t506, the gain of the amplification circuit 404 is set to a first gain.

If the optical signal level is smaller than a determination level Vs (S<Vs), A/D conversion is performed while keeping the gain of the amplification circuit 404 at the first gain. That is, as in the noise level readout period, A/D conversion of the optical signal level is performed from time t507 while a ramp circuit 403 supplies a first reference signal VRAMP-1 to the comparator 401. With this, in the example shown in FIG. 14, a count value is obtained in the period from time t507 to time t508. On the other hand, if the optical signal level is larger than the determination level Vs (S>Vs), the gain of the amplification circuit 404 is changed from the first gain to a second gain at time t1101, and then A/D conversion of the optical signal level is performed using the first reference signal VRAMP-1. With this, in the example shown in FIG. 14, a count value can be obtained in the period from time t507 to time t1102. With this, it is possible to implement expansion of the dynamic range and improvement of the S/N ratio.

As has been described above, in the fifth embodiment, readout of the noise level and readout of the optical signal level are performed while performing A/D conversion using the reference signal having the same change rate. However, in the fifth embodiment, the amplification circuit 404 reads out the noise level with the first gain, and reads out the optical signal level with the second gain. Therefore, even if a CDS circuit 900 performs a CDS process using the noise level and the optical signal level, the difference between the gains of the amplification circuit 404 (for example, the difference between the capacitance values concerning the gains) can cause an offset error. The fifth embodiment provides a function of removing or reducing an offset error that can occur, in the configuration in which the amplification circuit 404 amplifies the signal from the pixel array 101 with the gain selected from a plurality of gains, when amplifying the optical signal level and the noise level with different gains.

Like the photoelectric conversion apparatus 100 according to the first embodiment, the photoelectric conversion apparatus 100 according to the fifth embodiment executes a calibration operation for generating a correction value used to correct vertical shading, and an image capturing operation for generating an image by photoelectric conversion. In the calibration operation, the readout circuit 105 reads out signals from the reference pixels in reference pixel regions 703 and 704, and a signal processing unit 108 processes the signals. Thus, the correction value can be generated.

Figure 15A:
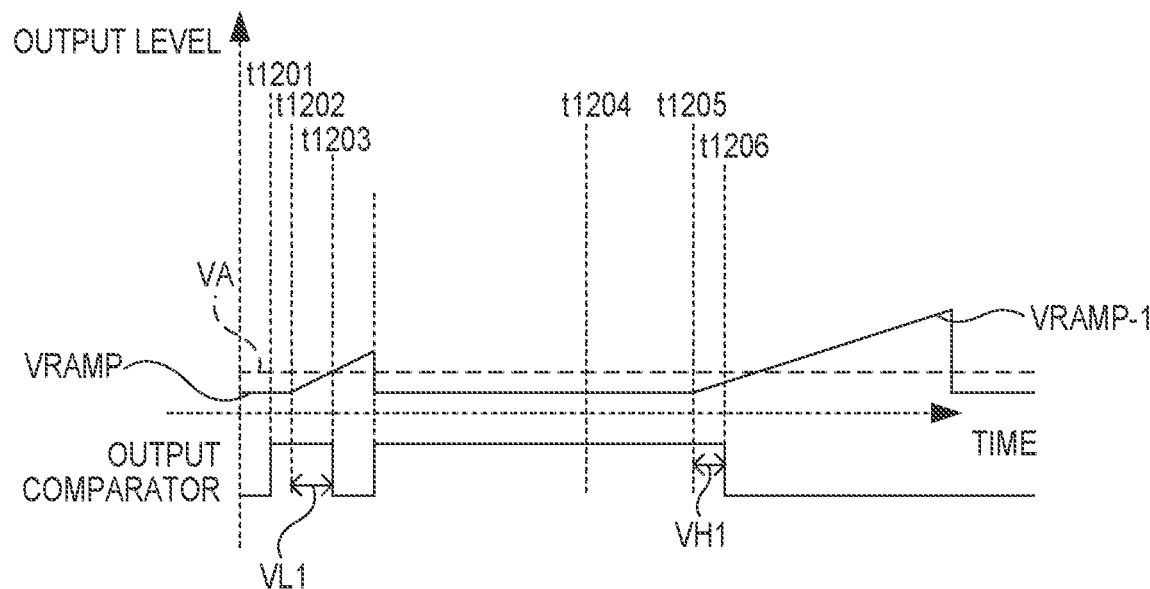
FIGS. 15A and 15B are views exemplarily showing an operation of reading out a signal from a reference pixel region in a calibration operation according to the fifth embodiment.

FIG. 15A exemplarily shows an operation of reading out a signal from the reference pixel in the first reference pixel region 703 in the calibration operation. First, an operation of A/D-converting a predetermined voltage (here, a predetermined voltage VL1 for the sake of descriptive convenience) by the column circuit 400 of the readout circuit 105 is performed. More specifically, the operation of the comparator 401 is started at time t1201. At time t1202, the count of a counter/latch circuit 402 is reset, and the first reference signal VRAMP-1, which changes at the first change rate, is supplied from the ramp circuit 403 to the comparator 401. The amplification circuit 404 outputs the voltage obtained by amplifying the predetermined voltage VL1 with the first gain, and an A/D conversion unit (401, 402, and 403) A/D-converts the amplified voltage. By performing a count operation in the period (time t1202 to time t1203) from the reset of the count of the counter/latch circuit 402 to the inversion of the output of the comparator 401, the amplification operation and A/D conversion of the predetermined voltage VL1 are performed.

Then, the amplification operation and A/D conversion of a predetermined voltage (here, a predetermined voltage VH1 for the sake of descriptive convenience) are performed. Here, the predetermined voltage VH1 is amplified with the first gain by the amplification circuit 404 (time t1204), and then A/D conversion of the amplified voltage is performed. By performing the count operation in the period from time t1205 to time t1206, the amplification operation and A/D conversion of the predetermined voltage VH1 are performed.

A first digital signal D1 obtained by reading out the predetermined voltage VL1 as described above and a second digital signal D2 obtained by reading out the predetermined voltage VH1 are supplied to the CDS circuit 900 of the signal processing unit 108 exemplarily shown in FIG. 9. In the CDS circuit 900, the first correction value used to correct the offset error is generated by the CDS process, and stored in a first holding region 9021 of a holding unit 902.

Figure 15B:
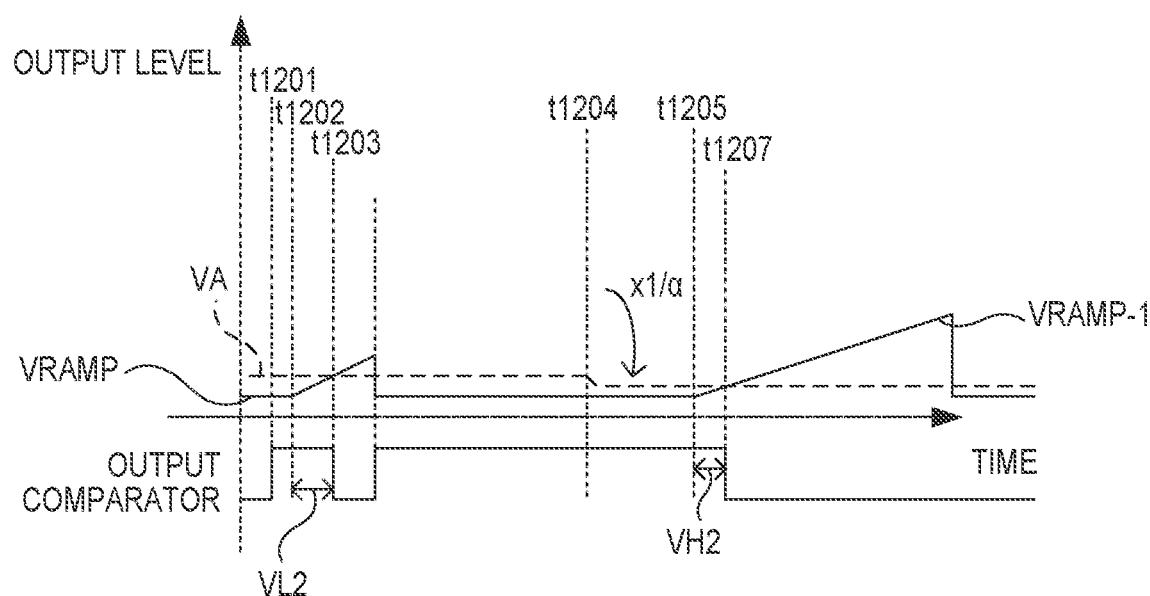

FIG. 15B exemplarily shows an operation of reading out a signal from the reference pixel in the second reference pixel region 704 in the calibration operation. First, an operation of A/D-converting a predetermined voltage (here, a predetermined voltage VL2 for the sake of descriptive convenience) by the column circuit 400 of the readout circuit 105 is performed. More specifically, the operation of the comparator 401 is started at time t1201. At time t1202, the count of the counter/latch circuit 402 is reset, and the first reference signal VRAMP-1, which changes at the first change rate, is supplied from the ramp circuit 403 to the comparator 401. The amplification circuit 404 outputs the voltage obtained by amplifying the predetermined voltage VL2 with the first gain, and the A/D conversion unit (401, 402, and 403) A/D-converts the amplified voltage. By performing the count operation in the period (time t1202 to time t1203) from the reset of the count of the counter/latch circuit 402 to the inversion of the output of the comparator 401, the amplification operation and A/D conversion of the predetermined voltage VL2 are performed.

Then, the amplification operation and A/D conversion of a predetermined voltage (here, a predetermined voltage VH2 for the sake of descriptive convenience) are performed. Here, the predetermined voltage VH2 is amplified with the second gain by the amplification circuit 404 (time t1204), and then A/D conversion of the amplified voltage is performed. By performing the count operation in the period from time t1205 to time t1207, the amplification operation and A/D conversion of the predetermined voltage VH2 are performed.

The first digital signal D1 obtained by reading out the predetermined voltage VL2 as described above and the second digital signal D2 obtained by reading out the predetermined voltage VH2 are supplied to the CDS circuit 900 of the signal processing unit 108 exemplarily shown in FIG. 9. In the CDS circuit 900, the second correction value used to correct the offset error is generated by the CDS process, and stored in a second holding region 9022 of the holding unit 902.

In the image capturing operation, a correction unit 1000 of the signal processing unit 108 corrects, using the first correction value or the second correction value provided from the holding unit 902, the signal output from the CDS circuit 900. In the image capturing operation, the CDS circuit 900 is provided with a pair of digital signals read out from the effective pixel or OB pixel via the column signal line 110 by the readout circuit 105 and stored in a memory unit 106, and luminance determination information LL. The CDS circuit 900 supplies, to the correction unit 1000, a signal Dcds obtained by performing the CDS process on the pair of digital signals, and the signal Dcds is supplied to a subtractor 1002. The holding unit 902 can supply, to a selection unit 1001, the first correction value corresponding to the pair of digital signals among a plurality of first correction values stored in the first holding region 9021. The holding unit 902 can also supply, to the selection unit 1001, the second correction value corresponding to the pair of digital signals among a plurality of second correction values stored in the second holding region 9022. If the luminance determination information LL corresponding to the pair of digital signals is 0, the selection unit 1001 supplies, to the subtractor 1002, the first correction value supplied from the first holding region 9021. If the luminance determination information LL is 1, the selection unit 1001 supplies, to the subtractor 1002, the second correction value supplied from the second holding region 9022. The correction unit 1000 performs calculation of subtracting, from the signal Dcds supplied from the CDS circuit 900, the first or second correction value supplied from the selection unit 1001, and outputs the result as a pixel signal DO.

Note that in the fifth embodiment, the column circuit 400' includes the A/D converter. However, the column circuit 400' may output the signal output from the amplification circuit 404 without performing A/D conversion.

Figure 16:
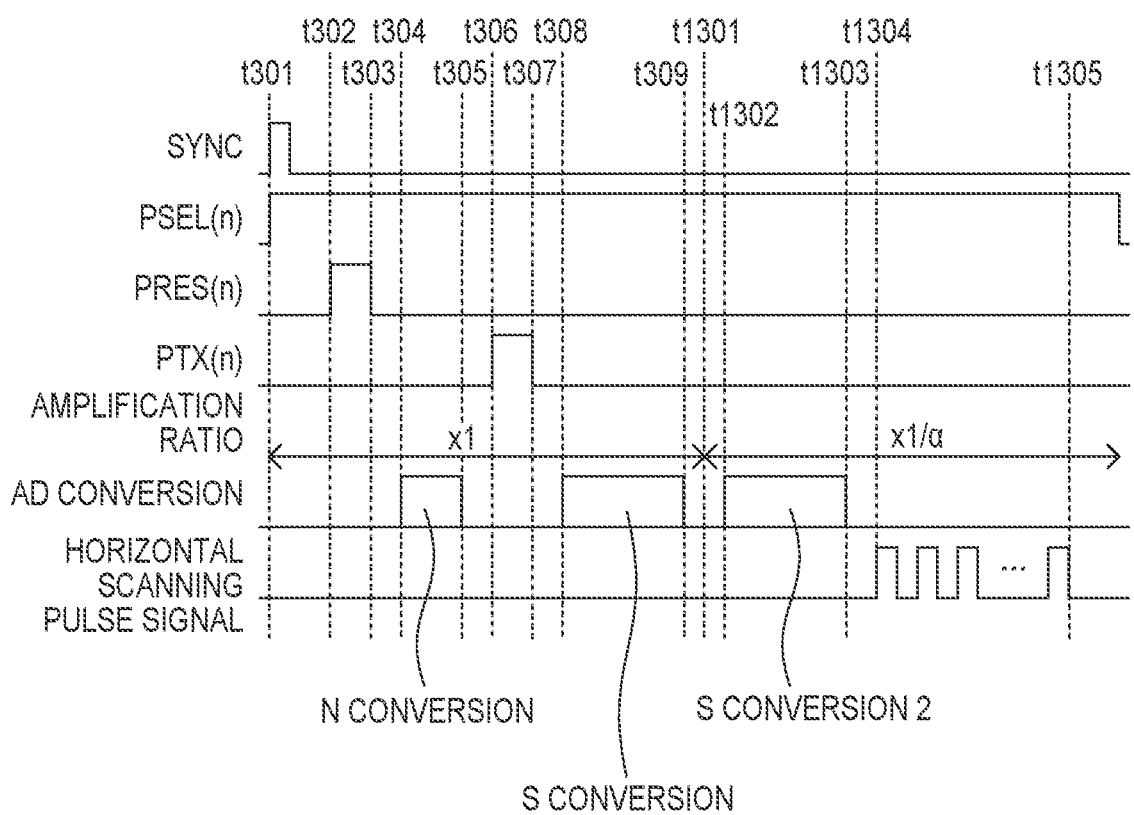
FIG. 16 is a view exemplarily showing the operation of a photoelectric conversion apparatus according to the sixth embodiment.

With reference to FIG. 16, a photoelectric conversion apparatus 100 according to the sixth embodiment will be described below. The photoelectric conversion apparatus 100 according to the sixth embodiment can have an arrangement similar to that of the photoelectric conversion apparatus 100 according to the fifth embodiment. Matters not mentioned as the sixth embodiment can follow the fifth embodiment. In the sixth embodiment, in order to expand the dynamic range, optical signal levels are read out while time-sequentially switching the gain of an amplification circuit 404.

FIG. 16 exemplarily shows the operation of one column circuit 400' in a readout circuit 105 in the sixth embodiment. Here, the operation of reading out signals from a pixel 102 in the jth row by a vertical scanning unit 103 is representatively shown. Note that each signal shown in FIG. 16 is a high-active signal. The operation of reading out the noise level and the optical signal level with the same gain is common to the operation in the period from time t301 to time t309 in FIG. 3. In FIG. 16, in the period from time t301 to time t309, the gain of the amplification circuit A404 is set at the first gain, and this is exemplarily shown as "×1"

At time t1301, the gain of the amplification circuit 404 is changed from the first gain (for example, ×1) to the second gain (for example, ×1/α) different from the first gain. Here, in order to change the gain of the amplification circuit 404, the feedback capacitance in the amplification circuit is changed. However, another configuration may also be used.

In the period from time t1302 to time t1303, the optical signal level output to a column signal line 110 is multiplied by 1/α by the amplification circuit 404, and then converted into a digital signal by the A/D conversion unit (401, 402, and 403). This operation is referred to as S conversion 2. In this manner, N conversion, S conversion, and S conversion 2 are performed, and each result is stored in a memory unit 106. Here, let N be the digital signal obtained by N conversion, S be the digital signal obtained by S conversion, and S2 be the digital signal obtained by S conversion 2.

In the period from time t1304 to time t1305, signals of the pixels 102 (the signal of each pixel is composed of N, S, and S2) for one row stored in the memory unit 106 can be sequentially selected by a horizontal scanning unit 107, and supplied to a signal processing unit 108. By performing the horizontal scanning until the last column, readout of signals (N, S, S2) of the pixels 102 for one row arranged in the readout target row is completed. The signal processing unit 108 includes a CDS circuit 900 that performs a CDS process of generating a pixel signal by subtracting the noise level from the optical signal level. The CDS circuit 900 outputs a pixel signal Dcds having undergone the CDS process.

The CDS circuit 900 of the signal processing unit 108 reduces the fixed pattern noise by performing a process of subtracting N from S and a process of subtracting N from S2. The dynamic range can be expanded using the signal obtained by subtracting N from S and the signal obtained by subtracting N from S2. However, since S2 and N are signals read out with gains different from each other, even if the process of subtracting N from S2 is performed, an offset error can remain. This offset error can appear as vertical stripes in an image output from the photoelectric conversion apparatus 100.

The correction value for correcting the offset error is acquired by a calibration operation similar to that in the fifth embodiment, and stored in a holding unit 902. In an image capturing mode, the signal obtained by subtracting N from S2 by the CDS circuit 900 can be corrected based on the correction value.

Figure 17:
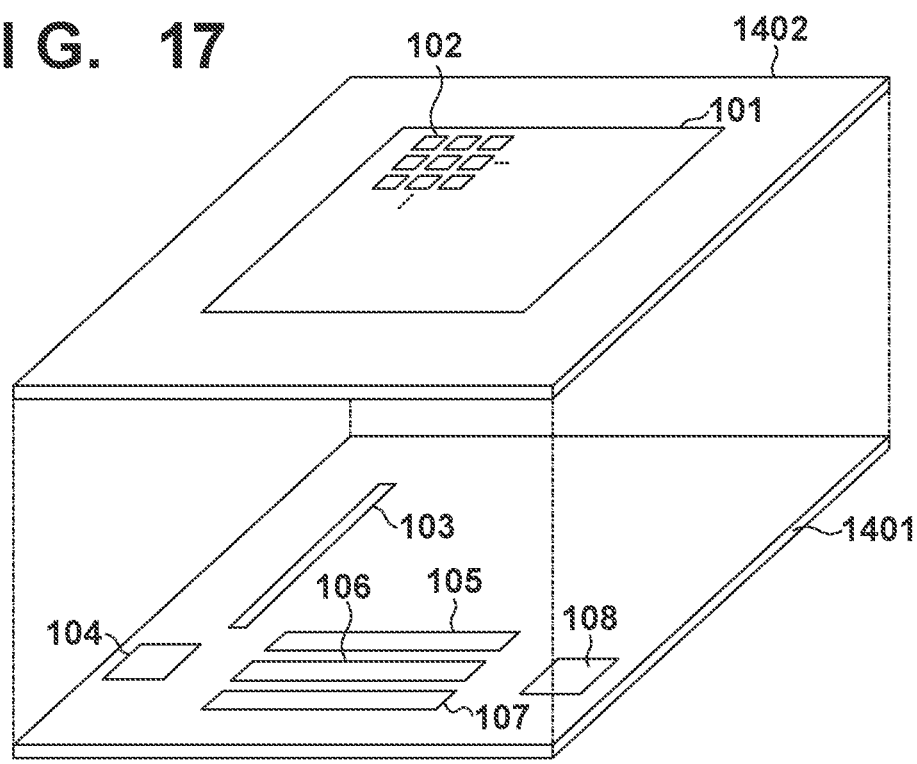
FIG. 17 is a view exemplarily showing the structure of the photoelectric conversion apparatus.

FIG. 17 shows an example of the structure of the photoelectric conversion apparatus 100 exemplarily described through the first to sixth embodiments of the third disclosure. The photoelectric conversion apparatus 100 may include a first substrate 1401 and a second substrate 1402. Each of the first substrate 1401 and the second substrate 1402 can be formed by processing, for example, a semiconductor substrate such as a silicon substrate. On the first substrate 1401, for example, the signal processing unit 108, the vertical scanning unit 103, a control unit 104, the readout circuit 105, the memory unit 106, the horizontal scanning unit 107, and the like can be arranged. On the second substrate 1402, for example, a pixel array 101 including an OB pixel region 701, an effective pixel region 702, and a reference pixel region 703 can be arranged. As exemplarily shown in FIG. 17, at least a part of the first substrate 1401 and at least a part of the second substrate 1402 can be stacked. With the arrangement as described above, when manufacturing the photoelectric conversion apparatus 100, it is possible to apply a process suitable for each of an analog portion including the pixel array 101 and a logic portion including the signal processing unit 108.

Figure 18:
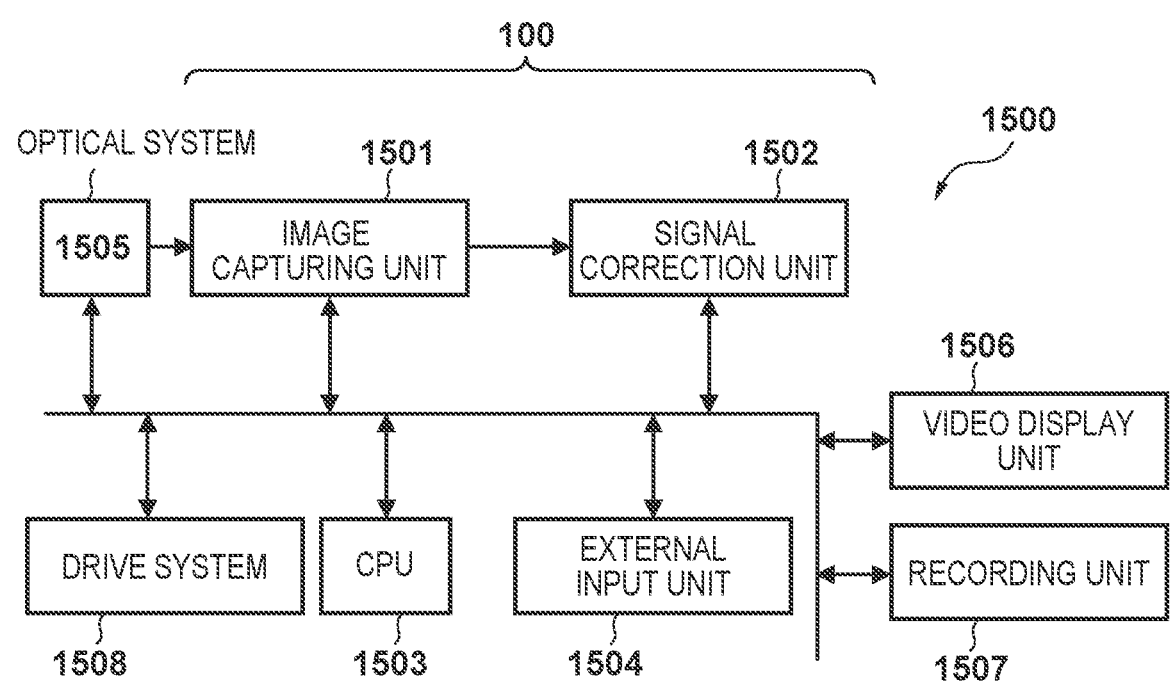
FIG. 18 is a view exemplarily showing the arrangement of an image capturing apparatus.

FIG. 18 exemplarily shows the arrangement of an image capturing apparatus 1500 incorporating the photoelectric conversion apparatus 100. The image capturing apparatus 1500 can include an image capturing unit 1501, a signal correction unit 1502, a CPU 1503, an external input unit 1504, an optical system 1505, a video display unit 1506, a recording unit 1507, and a drive system 1508. In an example, the image capturing unit 1501 is a functional block which includes the pixel array 101, the vertical scanning unit 103, the control unit 104, the readout circuit 105, the memory unit 106, and the horizontal scanning unit 107. Such the image capturing unit 1501 may be understood as a photoelectric conversion apparatus. Alternatively, the image capturing unit 1501 may be the photoelectric conversion apparatus 100 including the signal processing unit 108 described above. In an example, the signal correction unit 1502 can include the signal processing unit 108 described above.

In the pixel array 101 of the image capturing unit 1501, an optical image is formed by the optical system 1505. The image capturing unit 1501 outputs an image signal corresponding to the optical image by photoelectric conversion. The signal correction unit 1502 corrects the image signal output from the image capturing unit 1501, and outputs the corrected image signal to the video display unit 1506 and/or the recording unit 1507. The CPU 1503 controls the respective components in the image capturing unit 1500. The drive system 1508 can, for example, drive the focusing lens of the optical system 1505 and drive the aperture. The external input unit 1504 can include various kinds of buttons and the like used by a user to input an image capturing condition and perform a shutter operation. The video display unit 1506 may be a touch panel. In this case, the video display unit 1506 can function as the external input unit 1504 (a part thereof).

The present invention can also be implemented by executing the following process. That is, software (program) for implementing the above-described functions may be supplied to the system or apparatus via a network or various kinds of storage media. One or more processors (for example, a CPU and an MPU) in the computer of the system or apparatus can read out and execute the software (program). Alternatively, the above-described function can also be implemented by a circuit (for example, ASIC) having a fixed function, or a function definable circuit (for example, FPGA).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-140208, filed Sep. 2, 2022, which is hereby incorporated by reference herein in its entirety.

What is claimed is:

1. A photoelectric conversion apparatus comprising
a pixel array including a plurality of effective pixels,
a readout circuit configured to read out a signal of the pixel array, and
a signal processing unit configured to generate a pixel signal by performing correlated double sampling on signals read out by the readout circuit from an effective pixel selected from the plurality of effective pixels, and perform shading correction on the pixel signal, wherein
the readout circuit has a function of reading out a signal of the pixel array with a first gain, and a function of reading out a signal of the pixel array with a second gain different from the first gain,
the readout circuit reads out a noise level with the first gain and reads out an optical signal level with the first gain or the second gain from an effective pixel selected from the plurality of effective pixels for the correlated double sampling, and
in the shading correction, a pixel signal of an effective pixel from which an optical signal level has been read out with the first gain is corrected based on a first correction value, and a pixel signal of an effective pixel from which an optical signal level has been read out with the second gain is corrected based on a second correction value.

2. The photoelectric conversion apparatus according to claim 1, further comprising
a first holding unit configured to hold a plurality of first correction values respectively corresponding to a plurality of rows of the pixel array, and
a second holding unit configured to hold a plurality of second correction values respectively corresponding to the plurality of rows, wherein
the first correction value used in the shading correction is a first correction value obtained from the plurality of first correction values, and the second correction value used in the shading correction is a second correction value obtained from the plurality of second correction values.

3. The photoelectric conversion apparatus according to claim 1, wherein
when reading out an optical signal level from a selected effective pixel, the readout circuit selects the first gain or the second gain in accordance with the optical signal level.

4. The photoelectric conversion apparatus according to claim 1, wherein
the readout circuit includes an A/D converter, and
the readout circuit performs A/D conversion using a first reference signal, which changes at a first change rate, when reading out a signal of the pixel array with the first gain, and performs A/D conversion using a second reference signal, which changes at a second change rate larger than the first change rate, when reading out a signal of the pixel array with the second gain.

5. The photoelectric conversion apparatus according to claim 2, wherein
the pixel array includes a reference pixel region in which a plurality of reference pixels, each of which outputs a noise level, are arranged so as to form at least one column,
each of the plurality of first correction values is generated by performing correlated double sampling, by the signal processing unit, on a signal obtained by reading out, by the readout circuit, a noise level with the first gain in a first period from a reference pixel in a selected row among the plurality of reference pixels, and a signal obtained by reading out a noise level with the first gain in a second period, and
each of the plurality of second correction values is generated by performing correlated double sampling, by the signal processing unit, on a signal obtained by reading out, by the readout circuit, a noise level with the first gain in the first period from a reference pixel in the selected row among the plurality of reference pixels, and a signal obtained by reading out a noise level with the second gain in the second period.

6. The photoelectric conversion apparatus according to claim 2, wherein
the pixel array includes a first reference pixel region in which a plurality of reference pixels, each of which outputs a noise level, are arranged so as to form at least one column, and a second reference pixel region in which a plurality of reference pixels, each of which outputs a noise level, are arranged so as to form at least one column,
each of the plurality of first correction values is generated by performing correlated double sampling, by the signal processing unit, on a signal obtained by reading out, by the readout circuit, a noise level with the first gain in a first period from a reference pixel in a selected row among the plurality of reference pixels in the first reference pixel region, and a signal obtained by reading out a noise level with the first gain in a second period, and
each of the plurality of second correction values is generated by performing correlated double sampling, by the signal processing unit, on a signal obtained by reading out, by the readout circuit, a noise level with the first gain in the first period from a reference pixel in the selected row among the plurality of reference pixels in the second reference pixel region, and a signal obtained by reading out a noise level with the second gain in the second period.

7. The photoelectric conversion apparatus according to claim 2, wherein
the pixel array includes a reference pixel region in which a plurality of reference pixels, each of which outputs a noise level, are arranged so as to form at least one column,
each of the plurality of first correction values is generated by performing correlated double sampling, by the signal processing unit, on a signal obtained by reading out, by the readout circuit, a noise level with the first gain in a first period from a reference pixel in a selected row among the plurality of reference pixels, and a signal obtained by reading out a noise level with the first gain in a second period, and each of the plurality of second correction values is generated by performing correlated double sampling, by the signal processing unit, on a signal obtained by reading out, by the readout circuit, a noise level with the first gain in a third period from the reference pixel in the selected row among the plurality of reference pixels, and a signal obtained by reading out a noise level with the second gain in a fourth period, and the first period, the second period, the third period, and the fourth period are periods different from each other.

8. The photoelectric conversion apparatus according to claim 1, wherein the readout circuit includes an A/D converter, and the readout circuit performs A/D conversion using a first reference signal, which changes at a first change rate, when reading out a signal of the pixel array with the first gain, and performs A/D conversion using a second reference signal, which changes at a second change rate larger than the first change rate, when reading out a signal of the pixel array with the second gain.

9. The photoelectric conversion apparatus according to claim 1, wherein the readout circuit includes an amplification circuit configured to amplify a signal output from the pixel array, and an A/D converter configured to A/D-convert a signal output from the amplification circuit, and a gain of the amplification circuit used when reading out a signal of the pixel array with the first gain and a gain of the amplification circuit used when reading out a signal of the pixel array with the second gain are different from each other.

10. The photoelectric conversion apparatus according to claim 1, wherein the pixel array includes a plurality of OB pixels each of which includes a photoelectric conversion element shielded from light, and the signal processing unit performs correction based on signals read out from the plurality of OB pixels by the readout circuit, in addition to performing the shading correction on the pixel signal.

11. A photoelectric conversion apparatus comprising a pixel array including a plurality of effective pixels and a reference pixel, a readout circuit configured to read out a signal of the pixel array as a digital signal, and a signal processing unit configured to generate a pixel signal by performing correlated double sampling on signals read out by the readout circuit from an effective pixel selected from the plurality of effective pixels, and perform shading correction on the pixel signal, wherein the readout circuit has a function of reading out a signal of the pixel array with a first gain, and a function of reading out a signal of the pixel array with a second gain different from the first gain, the readout circuit reads out a noise level with the first gain and reads out an optical signal level with the first gain or the second gain from an effective pixel selected from the plurality of effective pixels for the correlated double sampling, in the shading correction, a pixel signal of an effective pixel from which an optical signal level has been read out with the second gain is corrected based on a correction value, and the correction value is generated by performing correlated double sampling, by the signal processing unit, on a signal obtained by reading out a noise level with the first gain in a first period from the reference pixel by the readout circuit, and a signal obtained by reading out a noise level with the second gain in a second period.

12. A photoelectric conversion system that comprises a photoelectric conversion apparatus and a signal processing unit, wherein the photoelectric conversion apparatus comprises a pixel array including a plurality of effective pixels, and a readout circuit configured to read out a signal of the pixel array as a digital signal, the signal processing unit generates a pixel signal by performing correlated double sampling on signals read out by the readout circuit from an effective pixel selected from the plurality of effective pixels, and performs shading correction on the pixel signal, the readout circuit has a function of reading out a signal of the pixel array with a first gain, and a function of reading out a signal of the pixel array with a second gain different from the first gain, the readout circuit reads out a noise level with the first gain and reads out an optical signal level with the first gain or the second gain from an effective pixel selected from the plurality of effective pixels for the correlated double sampling, and in the shading correction, a pixel signal of an effective pixel from which an optical signal level has been read out with the first gain is corrected based on a first correction value, and a pixel signal of an effective pixel from which an optical signal level has been read out with the second gain is corrected based on a second correction value.

13. A photoelectric conversion system that comprises a photoelectric conversion apparatus and a signal processing unit, wherein the photoelectric conversion apparatus comprises a pixel array including a plurality of effective pixels and a reference pixel, and a readout circuit configured to read out a signal of the pixel array as a digital signal, the signal processing unit generates a pixel signal by performing correlated double sampling on signals read out by the readout circuit from an effective pixel selected from the plurality of effective pixels, and performs shading correction on the pixel signal, the readout circuit has a function of reading out a signal of the pixel array with a first gain, and a function of reading out a signal of the pixel array with a second gain different from the first gain, the readout circuit reads out a noise level with the first gain and reads out an optical signal level with the first gain or the second gain from an effective pixel selected from the plurality of effective pixels for the correlated double sampling, in the shading correction, a pixel signal of an effective pixel from which an optical signal level has been read out with the second gain is corrected based on a correction value, and the correction value is generated by performing correlated double sampling, by the signal processing unit, on a signal obtained by reading out a noise level with the first gain in a first period from the reference pixel by the readout circuit, and a signal obtained by reading out a noise level with the second gain in the second period.

14. A photoelectric conversion method comprising reading out, as a digital signal, a noise level of an effective pixel in a pixel array with a first gain, reading out, as a digital signal, an optical signal level of the effective pixel with the first gain or a second gain different from the first gain, generating a pixel signal by performing correlated double sampling on the digital signal of the noise level and the digital signal of the optical signal level, and a step of performing shading correction on the pixel signal, wherein in the shading correction, a pixel signal of an effective pixel from which an optical signal level has been read out with the first gain is corrected based on a first correction value, and a pixel signal of an effective pixel from which an optical signal level has been read out with the second gain is corrected based on a second correction value.

15. A photoelectric conversion method comprising reading out, as a digital signal, a noise level of an effective pixel in a pixel array with a first gain, reading out, as a digital signal, an optical signal level of the effective pixel with the first gain or a second gain different from the first gain, generating a pixel signal by performing correlated double sampling on the digital signal of the noise level and the digital signal of the optical signal level, and performing shading correction on the pixel signal, wherein in the shading correction, a pixel signal of an effective pixel from which an optical signal level has been read out with the second gain is corrected based on a correction value, and the correction value is generated by performing correlated double sampling on a signal obtained by reading out a noise level with the first gain in a first period from a reference pixel in the pixel array, and a signal obtained by reading out a noise level with the second gain in a second period.

* * * * *